US012639473B2

(12) United States Patent
Beigi et al.

(10) Patent No.: US 12,639,473 B2
(45) Date of Patent: May 26, 2026

(54) SYSTEMS AND METHODS FOR GENERATING A SYNTHETIC DATASET FROM ROAD VEHICLE POSITIONING DATA

(71) Applicant: MEDIDATA SOLUTIONS, INC., New York, NY (US)

(72) Inventors: Mandis S. Beigi, White Plains, NY (US); Afrah Shafquat, Jericho, NY (US); Chao Sang, Pittsburgh, PA (US); Lokesh Bangaru, Erode (IN); Anna Zuo, Brooklyn, NY (US); Evon Okidi, Cambridge, MA (US); Jia Chen, New York, NY (US); Jacob Aptekar, Oakland, CA (US); Eric Yang, Warminster, PA (US)

(73) Assignee: MEDIDATA SOLUTIONS, INC., New York, NY (US)

( * ) Notice: Subject to any disclaimer, the term of this patent is extended or adjusted under 35 U.S.C. 154(b) by 47 days.

(21) Appl. No.: 18/913,820

(22) Filed: Oct. 11, 2024

(65) Prior Publication Data

US 2026/0105190 A1    Apr. 16, 2026

(51) Int. Cl.
*G06F 21/62* (2013.01)
(52) U.S. Cl.
CPC ................................ *G06F 21/6254* (2013.01)
(58) Field of Classification Search
None
See application file for complete search history.

(56) References Cited

U.S. PATENT DOCUMENTS

| | | |
|---|---|---|
| 11,640,446 B2 | 5/2023 | Beigi et al. |
| 11,977,550 B1 | 5/2024 | Aptekar et al. |

(Continued)

FOREIGN PATENT DOCUMENTS

| | | |
|---|---|---|
| CN | 108111294 A | 6/2018 |

OTHER PUBLICATIONS

Armanious et al., "MedGAN: Medical Image Translation using GANs," Computerized Medical Imaging and Graphics, vol. 79, 2020. [version submitted retrieved from arXiv:1806.06397v2 (16 pages)].

(Continued)

*Primary Examiner* — Bradley W Holder
(74) *Attorney, Agent, or Firm* — STEPTOE LLP; Carl B. Wischhusen

(57) ABSTRACT

Generating a synthetic dataset from road vehicle positioning data. The method involves iteratively selecting a seed record and determining a set of candidate partner records based on matching bigrams between the selected seed record and potential partner records. The method further includes determining subsequences for the candidate partner records and selected seed record based on locations of the matching bigrams. A candidate partner record is selected based on whether a length difference, in terms of time, distance, or number of road events, between the subsequences is less than a defined threshold. The subsequence of the selected seed record is replaced with the subsequence of the selected candidate partner record to produce a mutated seed record. The mutated seed records to produce a synthetic dataset.

21 Claims, 13 Drawing Sheets

(56) References Cited

U.S. PATENT DOCUMENTS

| | | | |
|---|---|---|---|
| 2003/0016147 A1* | 1/2003 | Evans | G08G 1/205 |
| | | | 340/988 |
| 2012/0030165 A1 | 2/2012 | Guirguis et al. | |
| 2018/0025303 A1 | 1/2018 | Janz | |
| 2019/0156061 A1 | 5/2019 | Chakraborty et al. | |
| 2021/0004017 A1* | 1/2021 | Colgate | G01C 21/30 |
| 2021/0133621 A1 | 5/2021 | Ravizza et al. | |
| 2021/0326652 A1* | 10/2021 | Hazard | G06N 5/045 |
| 2022/0067202 A1 | 3/2022 | Nedelec et al. | |
| 2023/0010686 A1 | 1/2023 | Lesh et al. | |
| 2023/0060848 A1* | 3/2023 | Beigi | G06F 18/2163 |

OTHER PUBLICATIONS

Beaulieu-Jones et al., "Privacy-preserving generative deep neural networks support clinical data sharing," BioRxiv, 2018 [version submitted retrieved from BioRxiv https://doi.org/10.1101/159756 preprint posted Jul. 2017 (16 pages)].

Beaulieu-Jones, Brett K. et al., "Privacy-Preserving Generative Deep Neural Networks Support Clinical Data Sharing," Circulation: Cardiovascular Quality and Outcomes, Jul. 2019.

Bindschaedler et al., "Plausible Deniability for Privacy-Preserving Data Synthesis" (Extended Version) [open access archive]; Aug. 26, 2017 [retrieved Nov. 26, 2021], Cornell University: arXiv, v1, 17 pages. Retrieved: https://arxiv.org/abs/1708.07975v1 (Year: 2017).

Choi et al., "Generating Multi-label Discrete Patient Records using Generative Adversarial Networks," Proceedings of Machine Learning for Healthcare, vol. 68, 2017. [version submitted retrieved from arXiv:1703.06490v3 (20 pages)].

Edge et al., "Design of a Privacy-Preserving Data Platform for Collaboration Against Human Trafficking", Sep. 18, 2020 [retrieved Jul. 29, 2022], Cornell University:arXiv [open-access archive], version v2, pp. 1-19. Retrieved: https://arxiv.org/abs/2005.05688 (Year: 2020).

El Emam et al., "Optimizing the synthesis of clinical trial data using sequential trees," Journal of the American Medical Informatics Association, 28(1), 2021. [version submitted retrieved from https://academic.oup.com/jamia/article/28/1/3/5981525 (11 pages)].

El Emam et al., "Anonymizing health data," O'Reilly Press Cambridge, 2014, pp. 1-44.

European Medicines Agency, Workshop Report "Data anonymisation—a key enabler for clinical data sharing," Dec. 2018. [version submitted retrieved from https://www.ema.europa.eu/en/documents/report/report-data-anonymisation-key-enabler-clinical-data-sharing_en.pdf (32 pages)].

Franconi et al. "Community Innovation Survey: comparable dissemination", Eurostat Methodologies and Working papers, 2009 edition, pp. 11-23.

Hall, Correlation-based Feature Selection for Machine Learning [thesis: The University of Waikato], Apr. 1999 [retrieved Nov. 26, 2021], 198 pgs. Retrieved: https://www.cs.waikato .ac.nz/-ml/publications/1999/99 MH-Thesis.pdf (Year: 1999).

Kasthurirathne et al., "Generative Adversarial Networks for Creating Synthetic Free-Text Medical Data: A Proposal for Collaborative Research and Re-use of Machine Learning Models," Proceedings—AMIA Joint Summits on Translational Science, pp. 335-344, May 2021.

McInnes et al., "UMAP: Uniform Manifold Approximation and Projection for Dimension Reduction", [open-access archive], Sep. 18, 2020 [retrieved Nov. 26, 2021], Cornell University:arXiv, v3, 63 pgs. Retrieved: https://arxiv.org/abs/1802.03426 (Year: 2020).

Park et al., "Data synthesis based on Generative Adversarial Networks," Proceedings of the VLDB Endowment, vol. 11, No. 10, Jul. 2018. [version submitted retrieved from arXiv:1806.03384v5 (16 pages)].

Sivakumar et al. "Synthetic sampling from small datasets: A modified mega-trend diffusion approach using k-nearest neighbors", Knowledge-Based Systems, vol. 236, 2022, pp. 1-12.

Srivastava et al., "Veegan: Reducing Mode Collapse in GANs using Implicit Variational Learning," 31st Conference on Neural Information Processing Systems, Nov. 2017. [version submitted retrieved from arXiv:1705.07761v3 (17 pages)].

Torra et al., "Evaluating Fuzzy Clustering Algorithms for Microdata Protection", PSD 2004, LNCS 3050, 2004, pp. 175-186.

Wang et al., "Privacy-preserving high-dimensional data publishing for classification", online: Mar. 3, 2020 [retrieved Jul. 29, 2022], Computers & Security, vol. 93, pp. 1-10. Retrieved: https://www.sciencedirect.com/science/article/pii/S0167404820300705 (Year: 2020).

Xu et al., "Modeling Tabular Data using Conditional GAN," 33rd Conference on Neural Information Processing Systems, Oct. 2019. [version submitted retrieved from arXiv:1907.00503v2 (15 pages)].

Yale et al. "Generation and evaluation of privacy preserving synthetic health data", Neurocomputing, vol. 416, 2020, pp. 244-255.

Zhang, J. et al., "PrivBayes: Private Data Release via Bayesian Networks," ACM Transactions on Database Systems, vol. 42, No. 4, Article 25, 2017, pp. 1-41. [version submitted retrieved from https://dl.acm.org/doi/pdf/10.1145/3134428].

Zhang, Z. et al., "Ensuring electronic medical record simulation through better training, modeling, and evaluation," Journal of the American Medical Informatics Association 27(1): 2019, pp. 99-108. [version submitted retrieved from https://academic.oup.com/jamia/article/27/1/99/5583723].

Zhu et al. "Private-kNN: Practical Differential Privacy for Computer Vision", 2020 IEEE/CVF Conference on Computer Vision and Pattern Recognition (CVPR), 2020, pp. 11851-11859.

Extended European Search Report from European Patent Application No. 22191229.8, Jan. 17, 2023, 9 pages.

Gursoy et al. "Utility-Aware Synthesis of Differentially Private and Attack-Resilient Location Traces", CCS '18: Proceedings of the 2018 ACM SIGSAC Conference on Computer and Communications Security, Oct. 2018, pp. 196-211.

Gursoy et al. "Differentially Private and Utility Preserving Publication of Trajectory Data", IEEE Transactions on Mobile Computing, vol. 18, No. 10, Oct. 1, 2019, 14 pages.

He et al. "DPT: Differentially Private Trajectory Synthesis Using Hierarchical Reference Systems", Proceedings of the VLDB Endowment, vol. 8, No. 11, Jul. 2015, pp. 1154-1165.

Wang et al. "PrivTrace: Differentially Private Trajectory Synthesis by Adaptive Markov Models", USENIX Security Symposium, Aug. 9-11, 2023, 22 pages.

Zhu et al. "SynMob: Creating High-Fidelity Synthetic GPS Trajectory Dataset for Urban Mobility Analysis", In Advances in Neural Information Processing Systems / 37th Conference on Neural Information Processing Systems (NeurIPS 2023) Track on Datasets and Benchmarks, 2023, 17 pages.

Extended European Search Report from European Patent Application No. 24169610.3, Sep. 6, 2024, 10 pages.

* cited by examiner

New POI $P_j'$ determined* within D distance of Original POI $P_j$ at a GPS record i

Original POI $P_j$ determined as driver spends > T mins at a GPS record i

* additional criteria may apply to determine new POI $P_j'$

| Metric | Value |
|---|---|
| Density Error | 0.001529 |
| Trip Error | 0.0717884681 |
| F1 score | 0.12 |
| Pattern support error | 0.88 |

FIG. 14

| Metric | Real data | Synthetic data |
|---|---|---|
| Average number of points | 599 | 679 |
| No of unique subjects/vehicles | 976 | 974 |
| No. unique roads | 3531 | 3468 |
| No. unique hexbins | 970 | 954 |
| Average distance (km) | 763.08 | 757.63 |
| Average distance lags (km) | 2.04 | 1.82 |
| Average start time | 2:09PM | 2.09PM |
| Average travel time (days) | 5.32 | 5.09 |
| Average time lags (minutes) | 66.71 | 63.4 |

FIG. 15

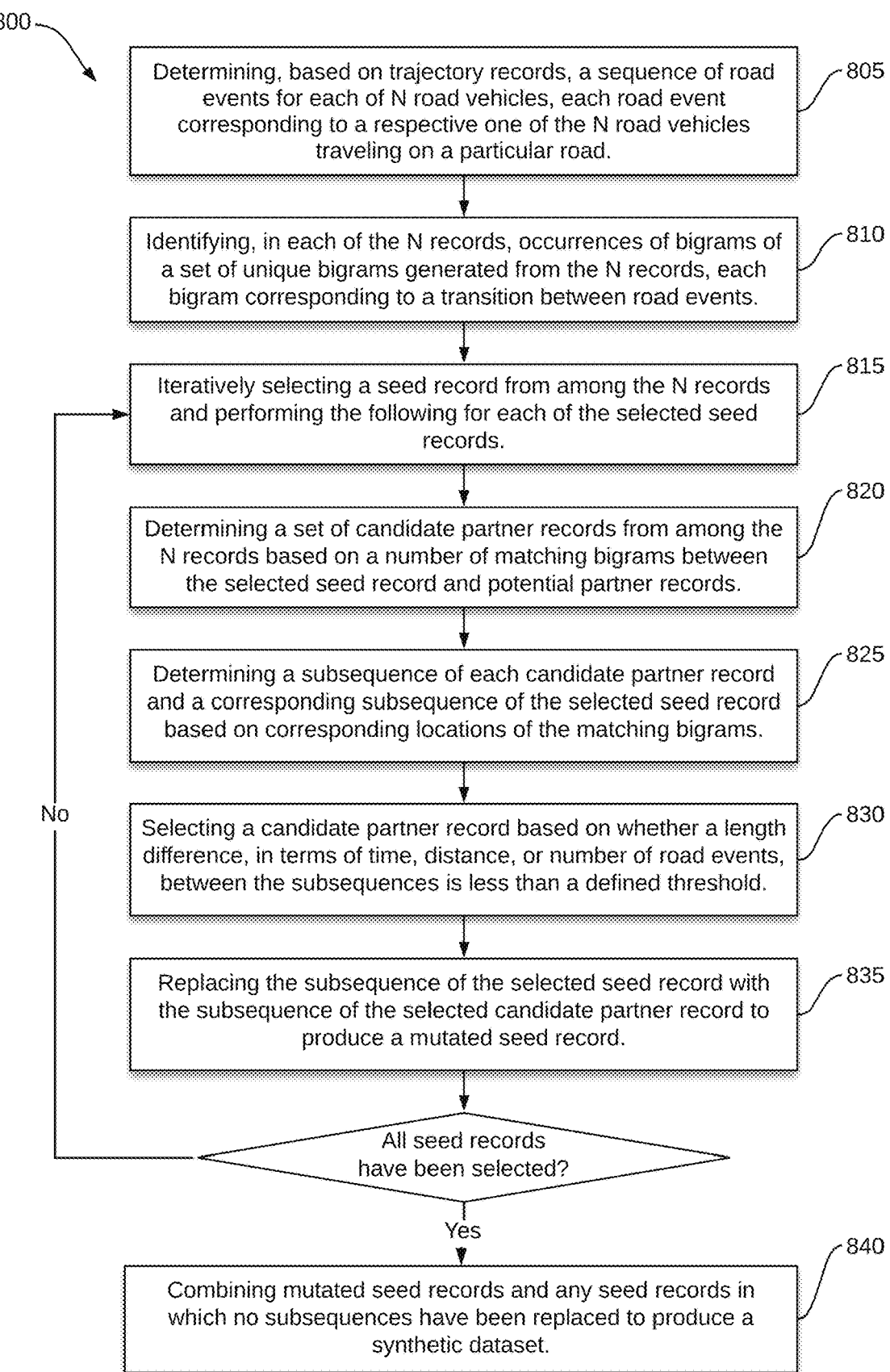

800

805 — Determining, based on trajectory records, a sequence of road events for each of N road vehicles, each road event corresponding to a respective one of the N road vehicles traveling on a particular road.

810 — Identifying, in each of the N records, occurrences of bigrams of a set of unique bigrams generated from the N records, each bigram corresponding to a transition between road events.

815 — Iteratively selecting a seed record from among the N records and performing the following for each of the selected seed records.

820 — Determining a set of candidate partner records from among the N records based on a number of matching bigrams between the selected seed record and potential partner records.

825 — Determining a subsequence of each candidate partner record and a corresponding subsequence of the selected seed record based on corresponding locations of the matching bigrams.

830 — Selecting a candidate partner record based on whether a length difference, in terms of time, distance, or number of road events, between the subsequences is less than a defined threshold.

835 — Replacing the subsequence of the selected seed record with the subsequence of the selected candidate partner record to produce a mutated seed record.

All seed records have been selected?

No

Yes

840 — Combining mutated seed records and any seed records in which no subsequences have been replaced to produce a synthetic dataset.

SYSTEMS AND METHODS FOR GENERATING A SYNTHETIC DATASET FROM ROAD VEHICLE POSITIONING DATA

BACKGROUND

Technical Field

The present disclosure generally relates to generating a synthetic mobility dataset from an original dataset and, in particular, generating a synthetic dataset from road vehicle positioning data.

Description of the Related Art

With advancements in location-based services and systems such as location-based sensors and global positioning systems, mobility and trajectory data have become widely available. Accessing mobility data holds the key to unlocking a plethora of applications, including urban planning, traffic monitoring, optimizing parking and recharging infrastructure (referred to as "curb management"), transforming mobility behaviors, monitoring vehicle health for software upgrades, and identifying risky driving behaviors for proactive risk reduction. The impact of such access is far-reaching, encompassing the reduction of traffic congestion and pollution caused by the search for parking and recharging stations, freeing up urban space for alternative uses like bike lanes, delivery services, and green areas, as well as enhancing citizen health, vehicle reliability, efficiency, and road safety.

Having such data publicly available increases the risk of re-identification based on trajectory patterns that can highlight points of interest (POI), whether private, such as home location, or public, such as office buildings, religious buildings, train and bus stations, and schools. Given how ubiquitous personal information is on public forums and social networks, it potentially introduces another layer of risk to the problem as this provides quasi-identifiers. If an adversary has prior knowledge about an individual in the dataset, an inference attack may be made when that information is linked to the trajectory data.

Conventional anonymization techniques can be applied to such data to help prevent re-identification, and these usually involve aggregation and obfuscation of the data. However, such techniques can substantially affect the utility of such data. Coarse data may not have the utility that is desired, for instance, spatial density and locality, frequent travel patterns, and spatio-temporal data points. Aggregation methods tend to remove the granularity that is important in the use cases described above and, therefore, they tend to have insufficient fidelity.

SUMMARY

In view of the deficiencies in conventional approaches discussed above, it is imperative to develop methodologies that preserve the fidelity and usefulness of the data, enabling the utilization of aggregate insights and user-specific patterns for various applications.

Disclosed embodiments provide a method for generating high fidelity trajectory data, represented, for example, as sequences of time-stamped latitude and longitude points. The disclosed techniques balance data fidelity and data privacy by obfuscating the data in a way that preserves the statistical properties while rendering the precise locations of individuals unidentifiable.

Disclosed embodiments synthesize data by reverse-geocoding trajectories (e.g., GPS trajectories) into sequences of street names, then exchanging similar patterns of street names between records. Additionally, the dates of statistically similar trajectories are swapped, and highly frequented points of interests (POIs) are exchanged with similar POIs. The synthetically generated data is statistically similar to the source data and captures the underlying dependencies and patterns of movement of the source data. Disclosed embodiments do not require retaining records from the original data and avoid revealing specific POIs from the original data, thereby allowing for practical use of the disclosed methods while preventing re-identification.

Disclosed embodiments provide a tunable algorithm that is configurable to adjust fidelity versus privacy. The tunable algorithm may be configurable to adjust to a use case of interest, if user-level behavior analytics are of interest, and/or may be configured for day/week/month/year-level or other temporal-scale analytics of interest. In embodiments, noise may be added to positioning system coordinates (e.g., GPS coordinates) and timestamps for additional anonymization.

The disclosed techniques maintain data fidelity while obfuscating the data in a way that preserves its statistical properties and rendering it unidentifiable to unauthorized users. This may allow researchers and developers to more widely access and analyze such data, which can accelerate the development of new applications and improvements.

Disclosed embodiments include generating a synthetic longitudinal vehicle positioning dataset, which includes converting a sequence of vehicle positioning record data to a road sequence and identifying subsequence patterns in road sequences. Feature vectors are determined, each characterizing a corresponding one of the records, based on the subsequence patterns. The feature vectors are embedded in a lower dimension space. A seed record is iteratively selected from among the records and in each iteration: subsequence patterns are identified in a subset of the records. Instances of subsequence patterns in the seed record are replaced with instances of similar subsequence patterns identified in the subset of the records to form a modified seed record. The iterations are repeated until all of the records have been selected as the seed record. For each modified seed record, timestamps are generated by preserving the lags between consecutive roads and exchanging the starting timestamps with similar records. The modified seed records are combined to form the synthetic road sequences dataset. Road sequences are then converted into vehicle positioning records and compiled into synthetic vehicle positioning datasets.

In one aspect, the disclosed embodiments provide methods, systems, and computer-readable media to generate a synthetic dataset from road vehicle positioning data. The method includes determining, based at least in part on trajectory records for N road vehicles, where N is an integer, a sequence of road events for each of the N road vehicles, each road event corresponding to a respective one of the N road vehicles traveling on a particular road, thereby producing N records. The method further includes identifying, in each of the N records, occurrences of bigrams of a set of unique bigrams generated from the N records, each bigram corresponding to a transition between road events.

The method further includes iteratively selecting a seed record from among the N records and performing the following for each of the selected seed records. For the
selected seed record, a set of candidate partner records is
determined from among the N records based at least in part
on a number of matching bigrams between the selected seed
record and potential partner records from among the N
records. For each candidate partner record, a subsequence of
each candidate partner record and a corresponding subse-
quence of the selected seed record are determined based at
least in part on corresponding locations of the matching
bigrams. A candidate partner record is selected from the set
of candidate partner records based at least in part on a
determination that a length difference, in terms of time,
distance, or number of road events, between the subse-
quence of the selected seed record and the corresponding
subsequence of each candidate partner record is less than a
defined threshold. The subsequence of the selected seed
record is replaced with the subsequence of the selected
candidate partner record to produce a mutated seed record After iterative selection of all of the seed records from
among the N records, mutated seed records and any seed
records in which no subsequences have been replaced are
combined to produce a synthetic dataset having N records.

Embodiments one or more of the following features,
alone or in combination.

The method may further include: receiving an original
dataset comprising the trajectory records for the N road
vehicles, the trajectory records comprising variable length
sequences, each including ordered or time-stamped geo-
graphic coordinates; assigning each geographic coordinate
to a geographic hexbin; performing reverse geocoding on
the trajectory records to obtain road names for each geo-
graphic coordinate; and combining the trajectory records to
form a composite dataset, each record of the composite
dataset comprises a vehicle identification, a latitude coordi-
nate, a longitude coordinate, a date and time stamp, a road
name, and a hexbin assignment.

The method may further include generating a bigram
dictionary by correlating the bigrams in the N records (r) to
produce the set of unique bigrams and determining a number
of occurrences of each of the unique bigrams. The method
may further include exchanging points of interest (POIs)
within the trajectory records with POIs within a defined
distance.

For each candidate partner record, the subsequence of the
selected seed record and the corresponding subsequence of
each candidate partner record may be defined as a set of
bigrams located between a location of a first selected match-
ing bigram and a location of a second selected matching
bigram of at least two matching bigrams.

The determining of the set of partner records may include
selecting a set of q partner records from among the N records
that are most similar to the selected seed record, where q is
an integer, and wherein similarity is based at least in part on
a number of matching bigrams between the selected seed
record and potential partner records from among the N
records. In the determining of a set of q partner records,
similarity may be based at least in part on the number of
matching bigrams between the selected seed record and the
potential partner records among the N records, divided by a
total number of unique bigrams within the selected seed
record.

The method may further include iteratively selecting a
seed record from among the N records of the synthetic
dataset and performing the following for each of the selected
seed records.

For the selected seed record, a set of candidate partner
records may be determined from among the N records based at least in part on a number of matching bigrams between the
selected seed record and potential partner records from
among the N records. For each candidate partner record, a
subsequence of each candidate partner record and a corre-
sponding subsequence of the selected seed record may be
determined based at least in part on corresponding locations
of the matching bigrams. For each candidate partner record,
the subsequence of the selected seed record and the corre-
sponding subsequence of each candidate partner record may
be defined as: (i) a set of bigrams located between a start of
the seed record or each candidate partner record, respec-
tively, and a location of a matching bigram of one or more
matching bigrams, or (ii) a set of bigrams located between
a location of the matching bigram, of the one or more
matching bigrams, and an end of the seed record or each
candidate partner record, respectively. A candidate partner
record may be selected from the set of candidate partner
records based at least in part on a determination that a length
difference, in terms of time, distance, or number of road
events, between the subsequence of the selected seed record
and the corresponding subsequence of each candidate part-
ner record is less than a defined threshold. The subsequence
of the selected seed record may be replaced with the
subsequence of the selected candidate partner record to
produce a mutated seed record.

After iterative selection of all of the seed records from
among the N records, mutated seed records and any seed
records in which no subsequences have been replaced may
be combined to produce a mutated synthetic dataset having
N records.

The determining of the set of partner records may include
selecting a set of partner records from among the N records
that have a same starting hexbin, and for each candidate
partner record, the subsequence of the selected seed record
and the corresponding subsequence of each candidate part-
ner record may be defined as a set of bigrams located
between a start of the seed record or a start of each candidate
partner record, respectively, and a location of a selected
matching bigram of one or more matching bigrams.

The determining of the set of partner records may include
selecting a set of partner records from among the N records
that have a same ending hexbin, and for each candidate
partner record, the subsequence of the selected seed record
and the corresponding subsequence of each candidate part-
ner record may be defined as a set of bigrams located
between a location of a selected matching bigram, of one or
more matching bigrams, and an end of the seed record or an
end of each candidate partner record, respectively.

In the selecting of one of the candidate partner records
from the set of candidate partner records, one of the candi-
date partner records may be randomly selected if more than
one of the candidate partner records has a length difference
less than the defined threshold.

BRIEF DESCRIPTION OF THE DRAWINGS

FIG. 14 defines the density error metric, which represents the Jensen-Shannon Divergence (JSD) between the density distributions across hexbins in the real and synthetic datasets.

FIG. 15 shows an example of a table of summary metrics for cross-validating the real and synthetic datasets from the Microsoft T-Drive dataset.

FIG. 16 is a flowchart of a method for generating a synthetic dataset from road vehicle positioning data, in accordance with disclosed embodiments.

Figure 1:
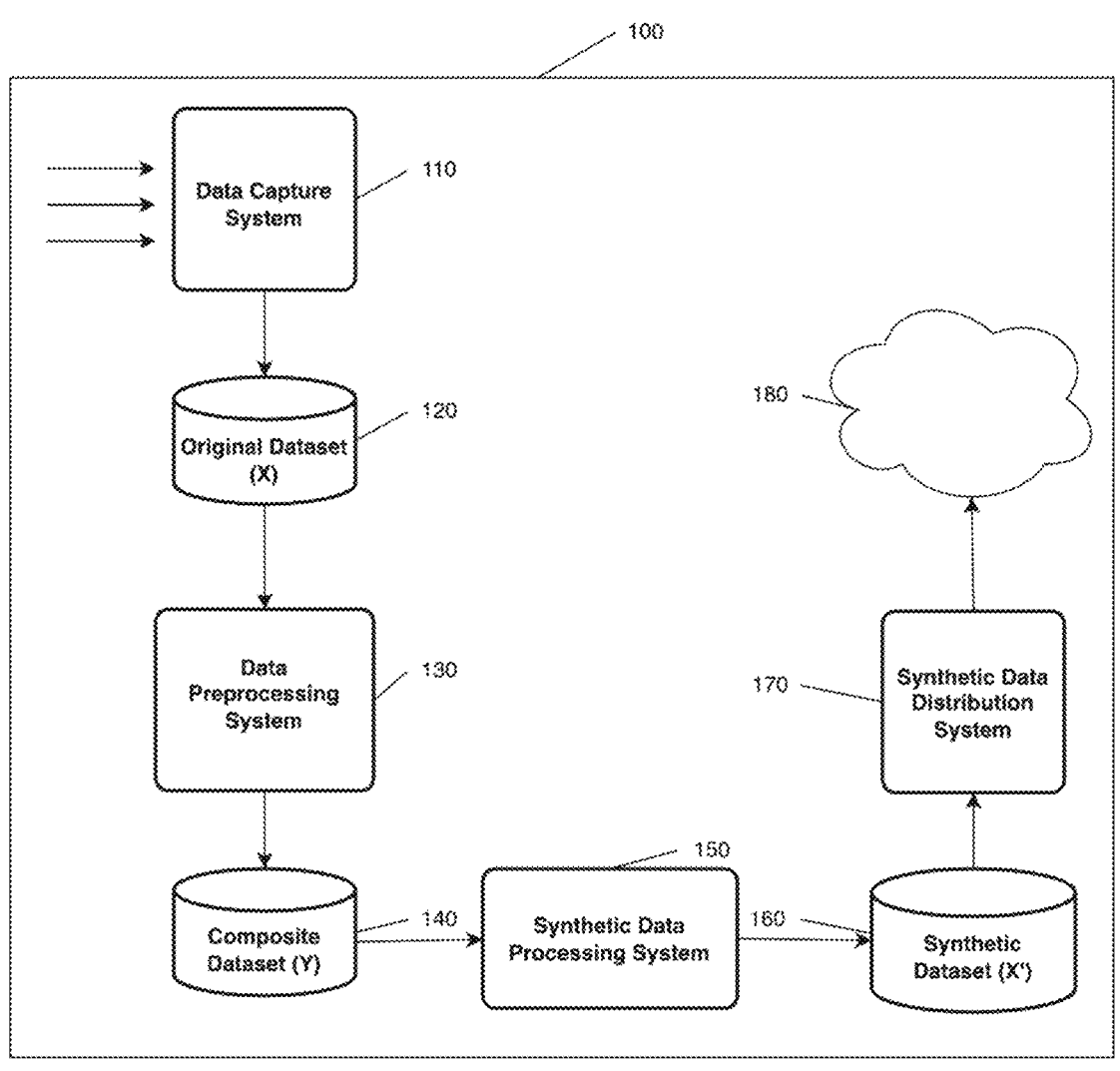
FIG. 1 is a block diagram of a system for generating and
distributing a synthetic longitudinal dataset from road
vehicle positioning data, according to disclosed embodi-
ments.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Disclosed embodiments provide a system and method to address the anonymization and privacy challenges discussed above by generating synthetic longitudinal geospatial datasets that still retain high fidelity. The method transforms vehicle positioning data into road names from street addresses. For each driver, the method identifies other drivers with similar sequences and then swaps instances of patterns (i.e., subsequences) that are similar to each other.

The method generates high-fidelity, synthetic longitudinal data, while performing enough transformation to the original sequences to maintain anonymity.

Maintaining anonymity for mobility data (e.g., GPS data), and preventing re-identification, is a technical problem, because it requires the development, implementation, and maintenance of complex methodologies and tools to ensure that sensitive personal geolocation information is protected and not exposed during data analysis and sharing. While the underlying motivation for ensuring data privacy may stem from ethical, legal, and regulatory concerns, the actual process of achieving and maintaining anonymity in geospatial data involves several technical aspects, including:

De-identification and anonymization: These processes involve removing Personally Identifiable Information (PII), such as locations for points of interest (POIs) and the exact spatial-temporal coordinates for trajectories. The process seeks to ensure that any remaining information cannot be traced back to specific individuals, thereby preventing re-identification.

Data encryption: Securely storing and transmitting trajectory data requires the use of robust encryption algorithms to protect the information from unauthorized access or interception.

Creating a synthetic dataset for trajectory data (e.g., GPS data) is a technical solution to the technical problems discussed above, because it addresses several challenges that are inherent in working with real-world trajectory data. Synthetic data generation techniques can create datasets that mimic the characteristics of the original data without exposing sensitive information, allowing researchers to work with the data while maintaining anonymity and data privacy. In some cases, access to and usage of trajectory data for research can be limited due to various factors, including data protection regulations, proprietary rights, and individual privacy concerns. Synthetic datasets can help overcome these barriers by generating additional data that shares similar properties with the original data, allowing researchers to develop and validate models without direct access and usage of the real data.

Furthermore, the technical solution involves algorithms and/or rules having specific characteristics which produce synthetic data which is heavily obfuscated, while maintaining the statistical properties of the original dataset. As discussed below, the technical solution is focused on specific improvements in the generation of synthetic datasets through the use of the specific algorithms and/or rules. It is the implementation of the specific algorithms and/or rules, not the mere use of a computer, that improves the existing technological process by providing improved data obfuscation and, hence, improved anonymization and data privacy. Thus, the technical solution provides a specific approach that improves the relevant technology, as opposed to being directed to an abstract result or effect which merely invokes generic processes and machinery.

In summary, creating synthetic datasets for trajectory data is a technical solution to a technical problem, because it addresses the specific challenges arising in achieving and maintaining anonymity when working with real-world trajectory data (e.g., GPS data). The technical solution uses specific algorithms and/or rules that render information into a new dataset having a specific set of characteristics (i.e., statistical characteristics similar to those of the original dataset) which is then used and applied to allow researchers to perform analysis of clinical trial data. The algorithms and/or rules described herein go beyond merely organizing existing information into a new form-they produce an entirely new dataset. The use of synthetic data generated in this manner can help overcome these challenges and enable more effective development, testing, and deployment of data-driven solutions in mobility research.

The following terminology is used herein. "Road" or "road event" are terms used to refer to the event in which a vehicle or individual is on a particular street, road, highway, path, etc., during a trajectory of travel. "Sequence" refers to an ordered set of road events or road event groups. "Subsequence" or "subsequence" refers to a set of road events or road event groups that represent part of a sequence. "Record," in particular contexts, refers to a sequence of events in a dataset associated with a particular vehicle or individual (or it may have its more general meaning in some instances). "Individual," "subject," or "driver" refers to the person or vehicle with which a set of mobility trajectory, vehicle positioning data, or other types of mobility data is associated—these terms may be used interchangeably herein with the term "vehicle". The terms "swap", "swapping", "exchange," or "exchanging" may refer to a one-way action, e.g., as in the replacement of a subsequence of a seed record with a corresponding subsequence of another record, or a two-way action, e.g., substituting a subsequence in the seed record with one from another record and vice versa. The term "bigram" refers to the occurrence of two subsequence events directly adjacent to one another, e.g., two road events, which would, in effect, define a particular road intersection.

FIG. 1 is a block diagram of a system 100 for generating and distributing a synthetic longitudinal dataset. The system 100 receives mobility data, e.g., Global Positioning System (GPS) data, that is collected via a system 110, which receives data from foot traffic or from a mobile vehicle. The data from system 100 may be in the form of a dataset, referred to as an "original dataset" 120, designated herein as X. As discussed in further detail below, the original dataset 120 is processed by a synthetic data processing system 150 to produce a synthetic dataset 160, designated herein as X'. The synthetic dataset 160 may be distributed to researchers for analysis, e.g., via a secure data sharing platform, referred to as the synthetic data distribution system 170, which makes the data available via a network 180.

The original dataset 120 may contain a number of variable length sequences, each including ordered, or time-stamped coordinates, consisting of latitude and longitude values. The original dataset 120 may include a number of tables ($T_1$, $T_2$ .... $T_n$), with each table containing an individual sequence. For example, GPS mobility data may be stored as a number of separate tables (e.g. in the CSV format commonly used for spreadsheets), in which each table may provide data for one specific individual's movements.

In embodiments, the tables and records of the original dataset 120 may be preprocessed by data preprocessing system 130 into street addresses in a process called reverse geocoding with the goal of obtaining the street names corresponding to each vehicle positioning system (e.g., GPS) coordinate. The system 130 may also preprocess original dataset 120 by assigning each coordinate to a hexagonal geographic cell, in a grid of such cells, which will herein be referred to as "hexbins".

Figure 12:
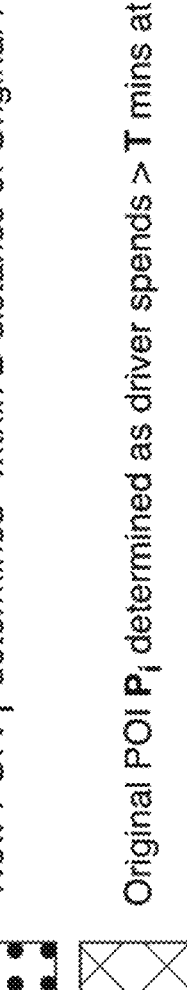
FIG. 12 is a diagram of providing point of interest (POI) anonymization by identifying and replacing original POIs with new POIs that fulfill defined criteria.
Figure 12:
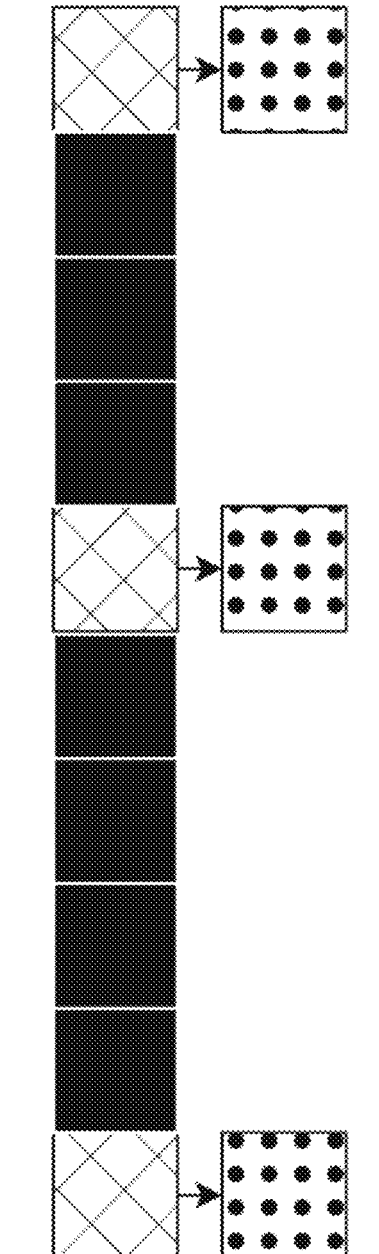

The system 130 may preprocess the original dataset 120 by exchanging points of interest (POIs) within trajectories with similar and nearby POIs as exemplified by FIG. 12. Original POIs identified in each individual's records in dataset X may be identified if the driver's time spent at the location is longer than T minutes. New POIs may be identified as POIs that are similar based on attributes (e.g., popularity, positively-reviewed, restaurants being replaced by other popular, positively-reviewed restaurants) and/or nearby (e.g., within a distance, D, of the original POI). New POIs may be inserted into the original trajectory by replacing the old POIs with the new POIs where the time spent at the original POI may now be spent at the corresponding new POI. A route between the remaining trajectory and the new POIs may be generated by synthesizing a route using route generation APIs. Any time difference introduced due to the additional time spent in commuting from the new POI to the remaining trajectory may be adjusted by modifying the time spent at the new POI. If similar and/or nearby POIs are not identified to the original POI, new POIs may be identified by relaxing the parameter D and how similar POIs are defined resulting in a larger pool of POIs from which to select new POIs. In cases in which POIs cannot be identified or a user of the algorithm does not want to insert new POIs, the original POIs may be removed where time spent at original POIs may also be removed or distributed equally across k GPS records (e.g., where the time spent is allotted to: GPS record after POI if k=1, GPS record before POI if k=−1, across two GPS records after POI if k=2).

The tables and records from the original dataset 120 may be combined to form a composite dataset 140, designed herein as Y, which stores data in variable data structures, such as rows and columns. The composite dataset Y may have records for N individuals, with each row having a subject ID for the individual (or a vehicle ID), a latitude coordinate, a longitude coordinate, a date and time stamp, a road name, and a hexbin assignment.

In disclosed embodiments, a synthetic longitudinal dataset 160 is generated from data received from the data collection system 110. The synthetic longitudinal dataset 160 is designed to mimic the statistical properties of the original dataset 120. This provides for the statistical properties of the original dataset 120 to be preserved, so accurate conclusions can be drawn by researchers, while de-identifying and obfuscating the data to reduce the risk of re-identification of individuals. The statistical properties of the synthetic dataset 160 may be validated against the original dataset 120 to ensure that it closely approximates the original dataset. This validation may be done using a variety of statistical tests, such as regression analysis.

The synthetic dataset may be distributed to researchers for analysis, e.g., via a secure data sharing platform, such as the synthetic data distribution system 170, which may involve setting up a private or public application program interface (API), creating a data repository, data portal, and/or using cloud-based data storage services with appropriate access controls, authentication, and encryption mechanisms. Researchers can use the synthetic dataset 160 to conduct longitudinal analysis with minimal risk of identifying individual participants.

Figure 2:
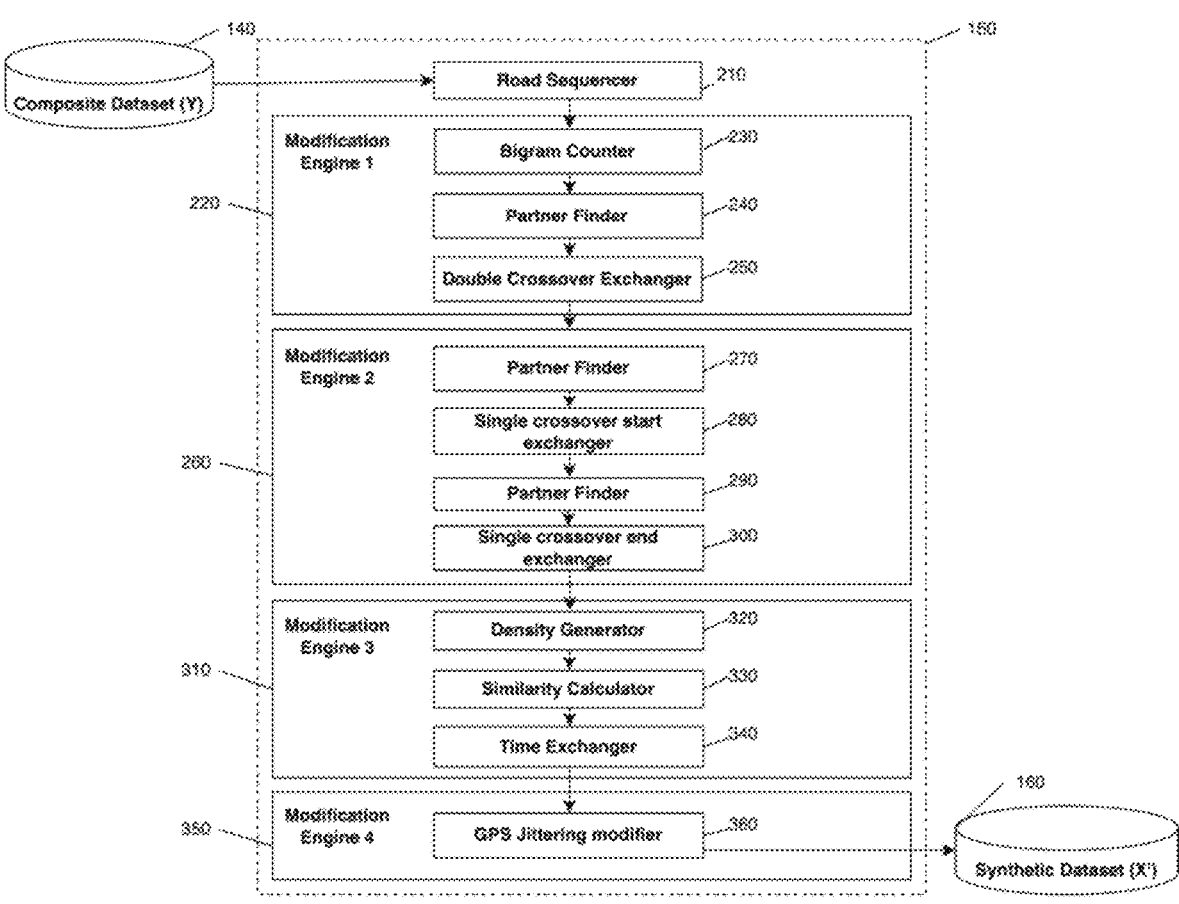
FIG. 2 is a diagram of a synthetic data processing system,
according to disclosed embodiments.

FIG. 2 is a diagram of the synthetic data processing system 150. As explained above, an original longitudinal dataset (X) may be received which includes mobility trajectory records for a number, N, of individuals (where N is an integer). The tables and records of the original dataset (X) may be preprocessed by the data preprocessing system 130, and then combined to form a composite dataset (Y). Each record may include a subject ID for the individual (or vehicle ID), a latitude coordinate, a longitude coordinate, a date and time stamp, a road name, and a hexbin assignment. Based on the information in Y, road sequencer 210 determines, for each of the N individuals, a sequence of road events ordered by the start date and time that the individual was on the road, thereby producing a set of N records (r) defining road sequences for N individuals. The road sequences differ in length from individual to individual, because each individual or vehicle passes through a different number of roads throughout the trajectory of travel.

Referring again to FIG. 2, the modification engine 220 receives the records (r) and uses them to produce a set of modified records that will eventually be fed into modification engine 260 for further modifications. Within modification engine 220, the bigram counter 230 first uses records (r) to create a bigram dictionary. A bigram represents a subsequence of two roads—for example if an individual or vehicle travels on road A then road B, or road B then road A, this would represent an occurrence of the bigram (road A, road B). For each of the N individuals, the bigram counter 230 may count the number of occurrences of each unique bigram that occurs. For example, for a given individual among the N individuals, there may be m unique bigrams, where m is an integer. For each of the m bigrams among each of the N individuals, there is a unique integer count p for the number of occurrences of the respective bigram within the respective individual.

Next, the partner finder 240 within modification engine 220 will determine a set of q partner individuals for each of the records r. This involves iteratively selecting a seed record $(r_s)$ from among the records (r) and then determining q partner records among records (r) that are most similar to seed record $(r_s)$. Similarity between the records is represented by the amount of overlap between the unique bigrams in the seed record $(r_s)$ and the potential partner record, where overlap is represented by the number of unique bigrams that the seed record $(r_s)$ and partner record have in common, divided by the total number of unique bigrams within the seed record $(r_s)$.

After determining the top q partner records per each seed record $(r_s)$, the double crossover exchanger 250 will perform mutations on each of the N seed records $(r_s)$. For each seed record $(r_s)$, the double crossover exchanger 250 will determine the location(s) of all matching bigrams between the seed record $(r_s)$ and each of the q partner records $(r_p)$. If at least two matching bigrams are located, the subsequences between the matching bigram pairs are considered as potential sequences to swap, where the subsequence in the seed is referred to as $s_s$ and the subsequence in the partner is referred to as $s_p$. Then the threshold t is defined, which represents either an integer count of road length or a numerical count of minutes spent on the roads or both (where separate threshold t values may be defined for roads and time spent). If the difference in time spent or road length (or both) for subsequences and $s_s$ and $s_p$ are within the threshold t, then $s_p$ is considered a potential subsequence of exchange for $s_p$. If there are more than one potential pair of subsequences $s_s$ and $s_p$ to swap between the seed record $(r_s)$ and a partner record $(r_p)$, then one pair of subsequences is chosen at random among the potential subsequences for exchange.

Figure 3:
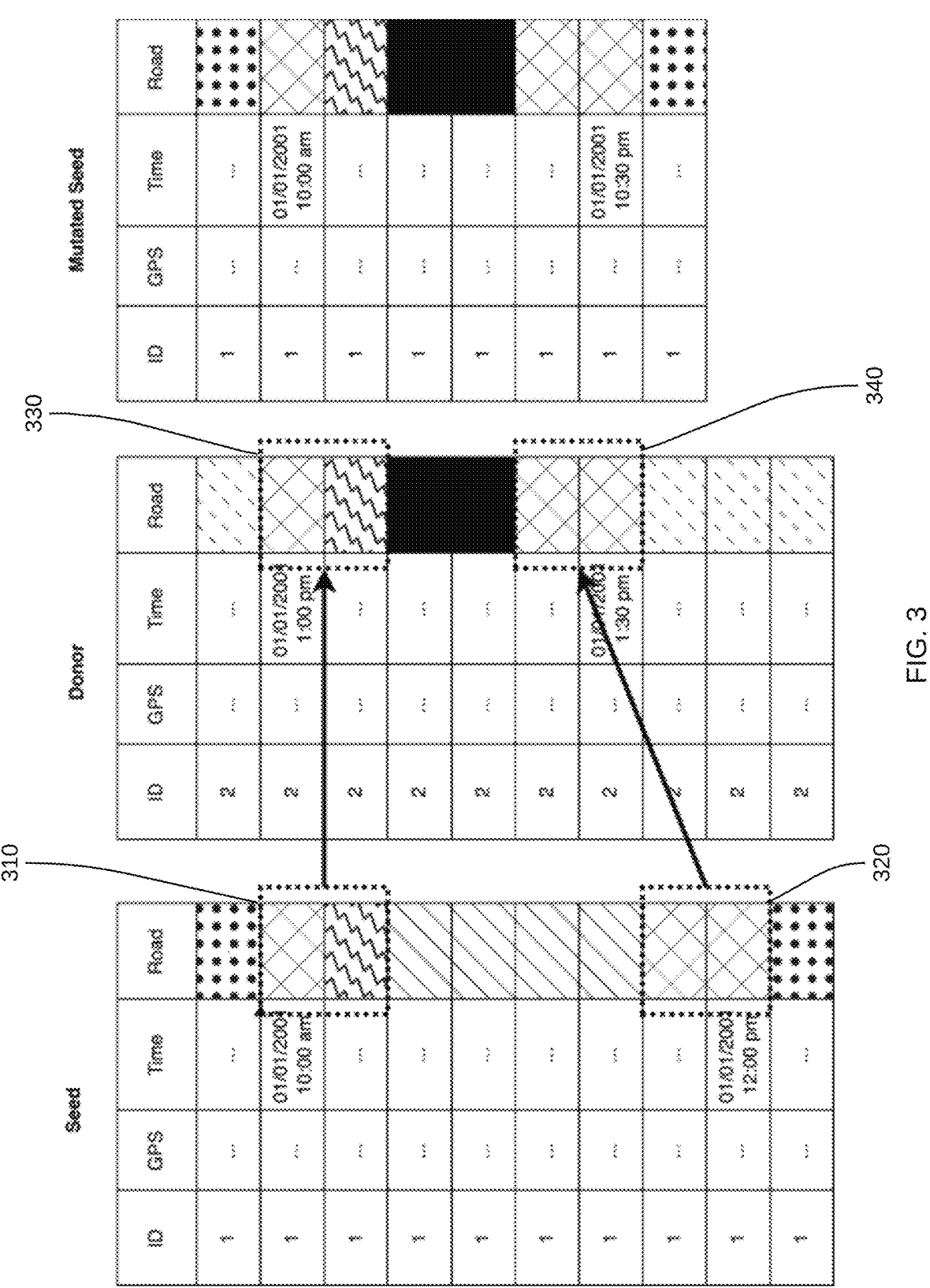
FIG. 3 depicts an example of instances of double cross-
over exchange where a subsequence in a seed path is
exchanged with a subsequence from a donor path.

If a pair of subsequences for exchange $s_s$ and $s_p$ is located for a seed record $(r_s)$ and partner record $(r_p)$, the subsequence $s_s$ within the seed record $(r_s)$ is replaced by the subsequence $(s_p)$ from the partner record $(r_p)$. The newly mutated seed record will be represented as $r_s'$. FIG. 3 depicts an example of subsequences being exchanged within the double crossover exchanger 250. In FIG. 3, the seed record $(r_s)$ is labeled as "Seed" and the partner record $(r_p)$ is labeled as "Donor". Between the seed record $(r_s)$ and partner record $(r_p)$, the double crossover exchanger 250 determines two pairs of matching bigrams, which are boxed in dotted lines. The subsequence $s_s$ has a length of 4 and is represented as the striped roads, while subsequence $s_p$ is of length 2 and is represented as solid roads. If the threshold t equals 5 roads, then this pair of subsequences $s_s$ and $s_p$ are considered a potential pair to swap since the difference between the subsequence lengths is 2, which is less than 5. If this pair of subsequences $s_s$ and $s_p$ is selected as the subsequences to swap, then the double crossover exchanger 250 will swap $s_s$ with $s_p$ and the new seed record $(r_s')$ will look like the record labeled as "Mutated Seed" in FIG. 3.

Once the N new records $(r_s')$ are obtained from the double crossover exchanger 250, these records are passed into the next modification engine 260 for further mutations. Within modification engine 260, the partner finder 270 first determines all potential partner records $(r_p)$ for each inputted seed record $(r_s')$, where the set of v partner records $(r_p)$ include all records among the N records r in which the sequence begins in the same hexbin as the sequence in seed record $(r_s')$.

Then, for each seed record $(r_s')$, the single crossover start exchanger 280 determines the locations of all bigrams in the seed record $(r_s')$ that have matching bigrams in at least one of the v partner records $(r_p)$. The subsequence $s_s$ represents the portion of the seed record $(r_s')$ from the start of the sequence to the location of a bigram that contains a matching pair within the partner records $(r_p')$. The potential donor subsequence $s_p$ represents the portion of a partner record $(r_p')$ from the start of the sequence to the location of a bigram that contains a matching pair with the seed record $(r_s')$. The single crossover start exchanger 280 then iteratively searches across all subsequence pairs $s_{s'}$ and $s_{p'}$ for the seed record $(r_s')$ and all v partner records $(r_{p'})$, and only keeps a singular pair $s_{s'}$ and $s_{p'}$ per seed record $(r_s')$ in which the difference between the time spent in the subsequence or the total number of roads in $s_{s'}$ and $s_{p'}$ is the minimum. If the difference in road length or time spent for subsequences and $s_{s'}$ and $s_{p'}$ are within the threshold t that was previously defined, then $s_{s'}$ within the seed record $(r_s')$ is replaced with $s_p$ to create a newly mutated seed record $(r_s'')$.

Figure 4:
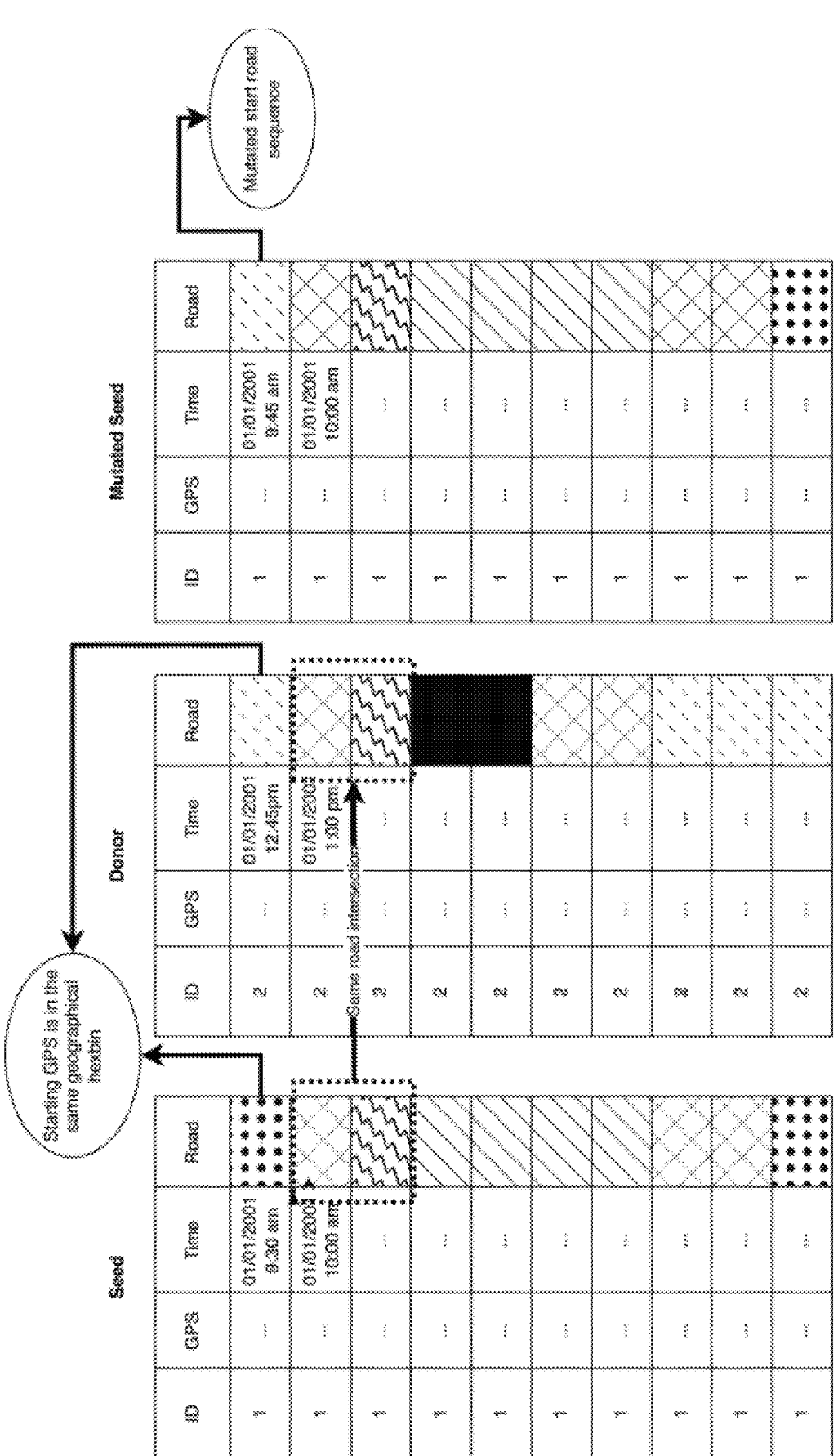
FIG. 4 depicts an example of instances of single crossover start exchange where a subsequence in a seed path is exchanged with a subsequence from a donor path.

FIG. 4 depicts an example of subsequences being exchanged within the single crossover start exchanger 280. In FIG. 4, the seed record $(r_s)$ is labeled as "Seed" and the partner record $(r_p)$ is labeled as "Donor". Between the seed record $(r_s)$ and partner record $(r_p)$, the single crossover start exchanger 280 determines a pair of matching bigrams, which is boxed in dotted lines. The seed subsequence $s_{s'}$ has a length of 1 from the start of sequence to the matching bigram, while donor subsequence $s_{p'}$ is of length 1. If the threshold t equals 5 roads, then this pair of subsequences $s_{s'}$ and $s_{p'}$ are considered a potential pair to swap since the difference between the subsequence lengths is 0, which is less than 5. The single crossover start exchanger 280 will swap $s_{s'}$ with $s_{p'}$ and the new seed record $(r_s'')$ will look like the record labeled as "Mutated Seed" in FIG. 4.

Once the N new records $(r_s'')$ are obtained from the single crossover start exchanger 280, these records are passed into the partner finder 290 to determine all potential partner records $(r_{p''})$ for each inputted seed record $(r_s'')$, where the set of w partner records $(r_{p''})$ include all records among the N records r in which the sequence ends in the same hexbin as the sequence in seed record $(r_s'')$.

Then, for each seed record $(r_s'')$, the single crossover end exchanger 300 determines the locations of all bigrams in the seed record $(r_s'')$ that have matching bigrams in at least one of the w partner records $(r_{p''})$. The subsequence $s_{s''}$ represents the portion of the seed record $(r_s'')$ from the location of a bigram that contains a matching pair within the partner records $(r_{p''})$ to the end of the sequence. The potential donor subsequence $s_{p''}$ represents the portion of a partner record $(r_{p''})$ from the location of a bigram that contains a matching pair with the seed record $(r_s'')$ to the end of the sequence. The single crossover end exchanger 300 then iteratively searches across all subsequence pairs $s_{s''}$ and $s_{p''}$ for the seed record ($r_s''$) and all w partner records ($r_{p''}$), and only keeps a singular pair $s_{s''}$ and $s_{p''}$ per seed record ($r_s''$) in which the difference between the time spent in subsequences or the total number of roads in $s_{s''}$ and $s_{p''}$ is the minimum. If the difference in road length or time spent for subsequences and $s_{s''}$ and $s_{p''}$ are within the threshold t that was previously defined, then $s_{s''}$ within the seed record ($r_s''$) is replaced with $s_{p''}$ to create a newly mutated seed record ($r_s'''$).

Figure 5:
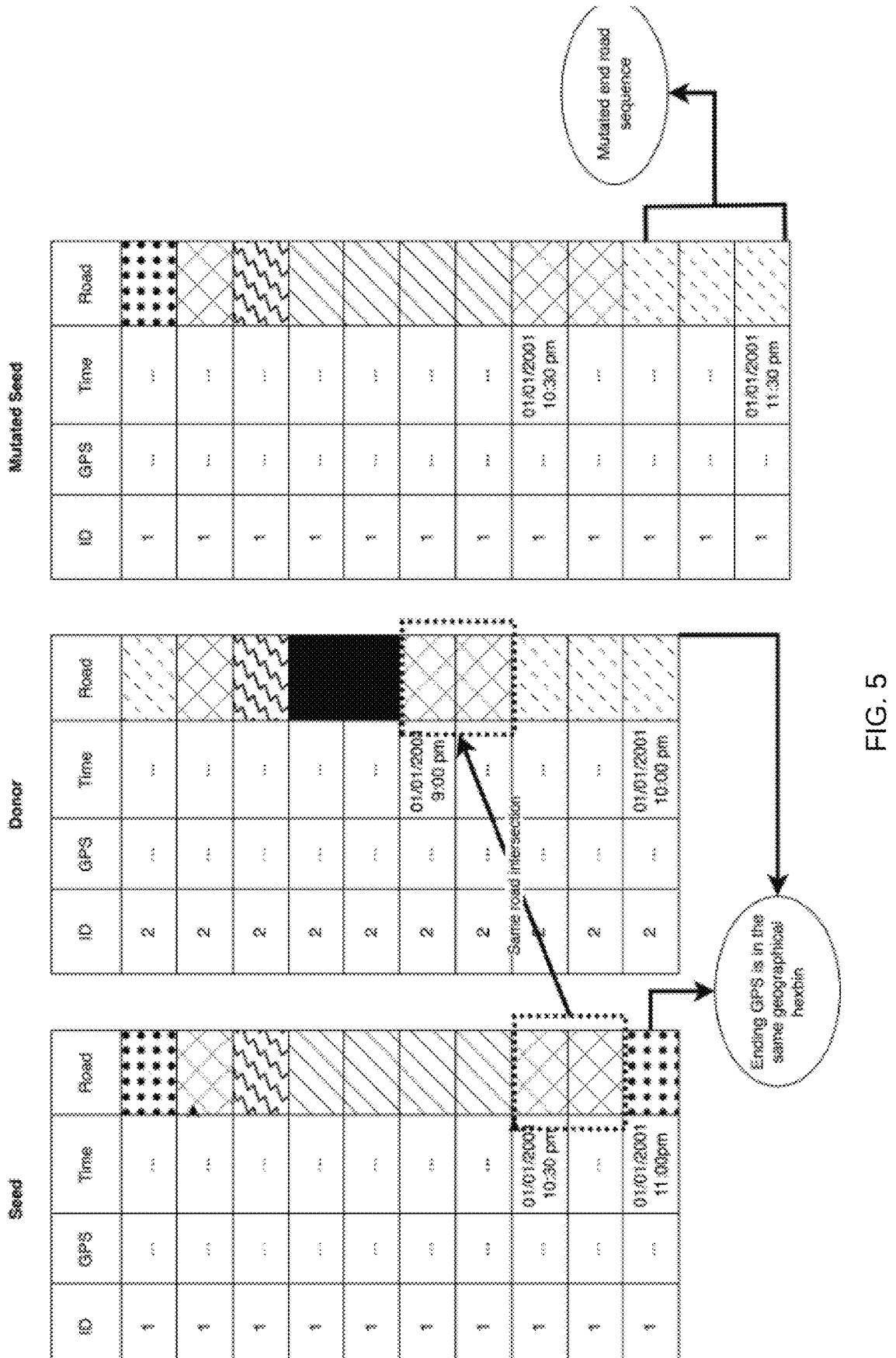
FIG. 5 depicts an example of instances of single crossover end exchange where a subsequence in a seed path is exchanged with a subsequence from a donor path.

FIG. 5 depicts an example of subsequences being exchanged within the single crossover end exchanger 300. In FIG. 5, the seed record ($r_{s''}$) is labeled as "Seed" and the partner record ($r_{p''}$) is labeled as "Donor". Between the seed record ($r_{s''}$) and partner record ($r_{p''}$), the single crossover end exchanger 300 determines a pair of matching bigrams, which is boxed in dotted lines. The seed subsequence $s_{s''}$ has a length of 1 from the matching bigram to the end of the sequence, while donor subsequence $s_{p''}$ has a length of 3. If the threshold t equals 5 roads, then this pair of subsequences $s_{s''}$ and $s_{p''}$ are considered a potential pair to swap since the difference between the subsequence lengths is 2, which is less than 5. The single crossover end exchanger 300 will swap $s_{s''}$ with $s_{p''}$ and the new seed record ($r_s'''$) will look like the record labeled as "Mutated Seed" in FIG. 5.

Figure 13:
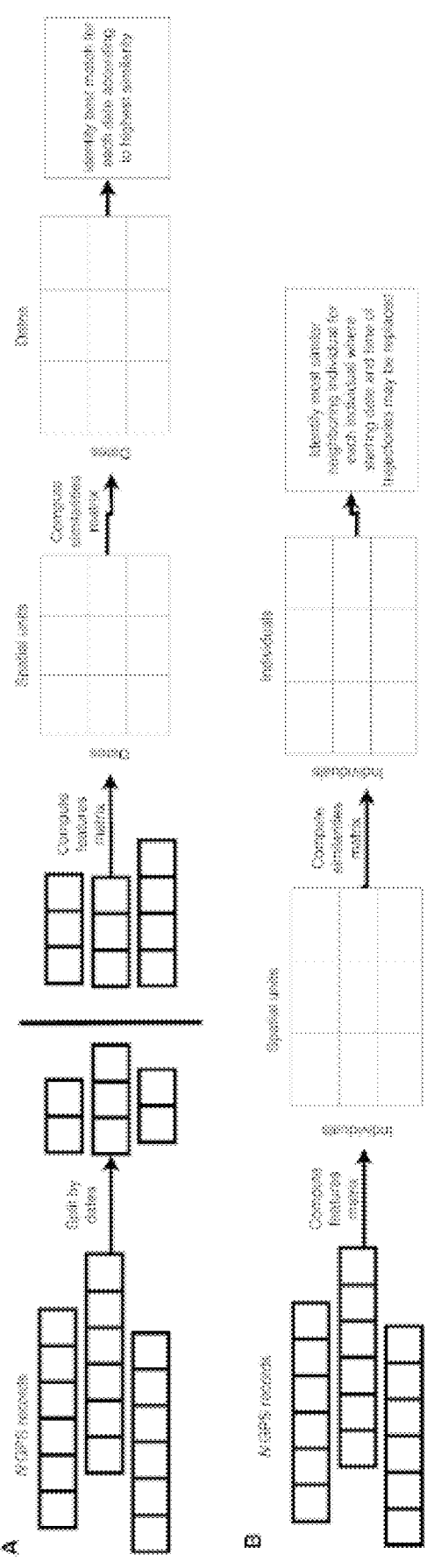
FIG. 13 is a diagram illustrating time synthesis where (A) represents identifying similar dates where dates are swapped in synthetic data, (B) represents identifying similar individuals where starting date and times are swapped.

Once the N new records ($r_s'''$) are obtained from the single crossover end exchanger 300, these records are passed into the next modification engine 310 for further mutations (see FIG. 13). The modification engine 310 can either perform temporal exchanges in terms of dates or in terms of individual subjects. Within modification engine 310, the density generator 320 first computes the counts of the hexbin bigrams, where a hexbin bigram represents a subsequence of two hexbin assignments—for example if an individual or vehicle travels through hexbin A then hexbin B, this would represent an occurrence of the bigram (hex A, hex B). If the modification engine 310 is modifying in terms of dates, the density generator 320 will compute hexbin bigram counts for each unique date found across all N records ($r_s'''$). If the modification engine 310 is modifying in terms of individual subject, the density generator 320 will compute hexbin bigram counts for each unique subject ID (or vehicle ID).

Once the density generator 320 computes the density counts of hexbin bigrams, the similarity calculator 330 will then compute the cosine similarity scores between individual density records. If the modification engine 310 is modifying in terms of dates, then the similarity calculator 330 will compute a similarity score between each unique pair of dates. If the modification engine is modifying in terms of unique subjects, then the similarity calculator 330 will compute a similarity score between each unique pair of subject IDs (or vehicle IDs).

After the similarity calculator 330 has computed the cosine similarity scores between all pairs of dates or unique subjects, the time exchanger 340 will take the pairings with the highest similarity scores to perform exchanges. If the modification engine 310 is modifying in terms of dates, the time exchanger 340 will replace the dates across all N records ($r_s'''$) with the date that has the highest similarity score. For example, if date B has the highest similarity to date A, then date A in all records ($r_s'''$) will be replaced with date B. If the modification engine 310 is modifying in terms of subjects, then the time exchanger 340 will replace the start times for all subject IDs across the N records ($r_s'''$) with the start times of subjects that have the highest similarity score. For example, if subject ID B has the highest similarity to subject ID A, then the start date in the record for subject A will be replaced with the start date from the record for subject B. The newly mutated records generated by the time exchanger 340 will be referred to as $r_t$.

The GPS jitter modifier 360 in modification engine 350 will take the final set of N mutated seed records ($r_t$), and will apply noise by multiplying the distance of each subsequent GPS point in the seed record (n) by a noise ratio, that is represented as a numerical value between 0 and 1, inclusive. The final modified seed records are outputted from the GPS jitter modifier 360 and combined into the synthetic dataset (X') 370.

In addition to the description above and accompanying figures, implementations may be based at least in part on the following methodological pseudo code for synthesizing vehicle positioning system mobility data:

1. Original dataset X; X is comprised of tables where each table consists of records of vehicle positioning system points, including latitude and longitude coordinates, date and time stamps, road names, and hexbin assignments for N individuals
2. Concatenate the tables for all N individuals into dataset Y such that each row has subject ID (or vehicle ID), latitude coordinates, longitude coordinates, road names, and hexbin assignments
3. Create sequences of road events for N subjects ordered by start date and time that a subject (i.e., a vehicle) was on the road, thereby producing a set of N records (r) defining road sequences for N individuals
4. Perform double crossover mutations on each of the N records (r):
   a. For i in r.
      i. Create bigram dictionary
      ii. Find set of q partners for the seed record ($r_s$) from N records (r)
      iii. For j in set of q partner records ($r_p$):
         1. If at least two matching bigrams are located between $r_s$ and $r_p$:
            a. If difference in road sequence lengths or time durations of sequences $s_s$ and $s_p$ are within threshold t:
               i. Swap subsequence $s_s$ in seed with subsequence $s_p$ in a partner to obtain new seed records ($r_s'$)
5. Perform single crossover mutation on each of the N records ($r_s'$):
   a. For i in $r_s'$:
      i. Find set of v partners for seed record ($r_s'$) with matching start hexbins
      ii. For j in set of v partner records ($r_p'$):
         1. If at least one matching bigram is located between $r_s'$ and $r_p'$:
            a. Consider $s_s'$ as the seed subsequence from the start of sequence until the matched bigram, and $s_p'$ as the partner subsequence from the start of sequence until the matched bigram
            b. If difference in road sequence lengths or time durations of sequences $s_s$ and $s_p$ are within threshold t:
               i. Swap subsequence $s_s'$ in seed with subsequence $s_p'$ in a partner to obtain new seed records ($r_s''$)
      iii. Find set of v partners for seed record ($r_s''$) with matching end hexbins
      iv. For j in set of v partner records ($r_p'$):
         1. If at least one matching bigram is located between $r_s''$ and $r_p''$:

a. Consider $s_s''$ as the seed subsequence from the matched bigram to the end of sequence, and $s_p''$ as the partner subsequence from the matched bigram to the end of sequence b. If difference in road sequence lengths or time durations of sequences $s_s''$ and $s_p''$ are within threshold t:

i. Swap subsequence $s_s''$ in seed with subsequence $s_p''$ in a partner to obtain new seed records ($r_s'''$)

6. Perform temporal mutation on each of the N records ($r_s'''$):

a. For i in $r_s'''$:

i. If mutating in terms of date:

1. Compute the numeric properties (counts/densities) of n-grams (e.g., hexbin or road sequence) for each unique date amongst the N records ($r_s'''$) where n is an integer value greater than or equal to 1

2. Using the similarity calculator, compute scores (e.g., cosine similarity) for the properties of each pair of dates 3. For each date within the N records ($r_s'''$), exchange the date A with the date B with the highest similarity score to obtain N records ($r_t$)

ii. If mutating in terms of subject:

1. Compute the numeric properties (counts/densities) of n-grams (e.g., hexbin or road sequence) for each of the N unique subjects for the records ($r_s'''$)

2. Using the similarity calculator, compute similarity scores (e.g., cosine similarity) for the properties of each pair of subjects 3. For each subject ID (or vehicle ID) within the N records ($r_s'''$), exchange the starting date of subject A with the starting date of subject B with the highest similarity score to obtain N records ($r_t$)

7. Perform vehicle positioning system jittering for each of the N records ($r_t$):

a. For i in $r_t$:

i. Apply noise to the vehicle positioning system coordinates by multiplying the distance of each subsequent point by a noise ratio to obtain the final seed record b. Combine all modified seed records to obtain synthetic dataset (X')

To evaluate the fidelity of the synthesized longitudinal datasets, cross-validation tests were performed to compare properties of the synthetic datasets to properties of the real datasets to assess how well the underlying properties of the real datasets were preserved. As discussed in further detail below, a number of metrics can be used in the cross-validation, such as density error, trip error, pattern score and error, length error, etc.

Figure 6:
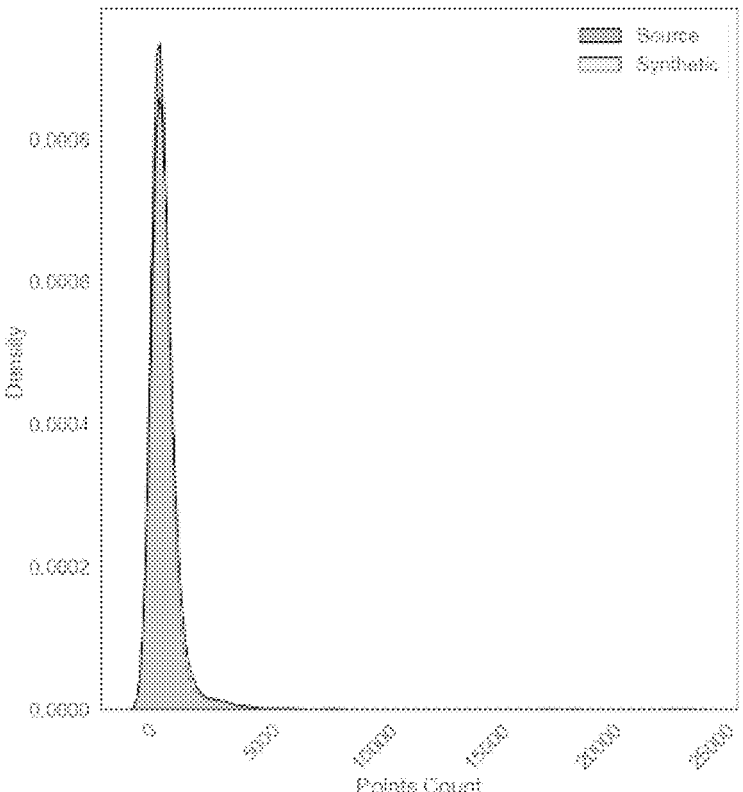
FIG. 6 is a density plot of GPS records/points contained in an individual's path in the real and synthetic datasets for T-drive dataset.
Figure 7:
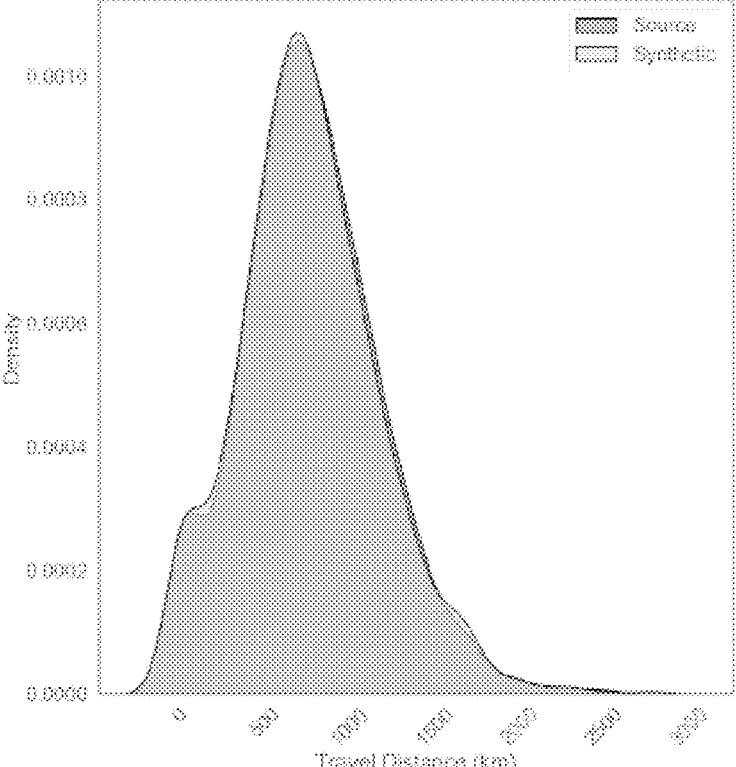
FIG. 7 is a density plot of traveling distance calculated for an individual's path in the real and synthetic datasets for T-drive dataset.
Figure 8:
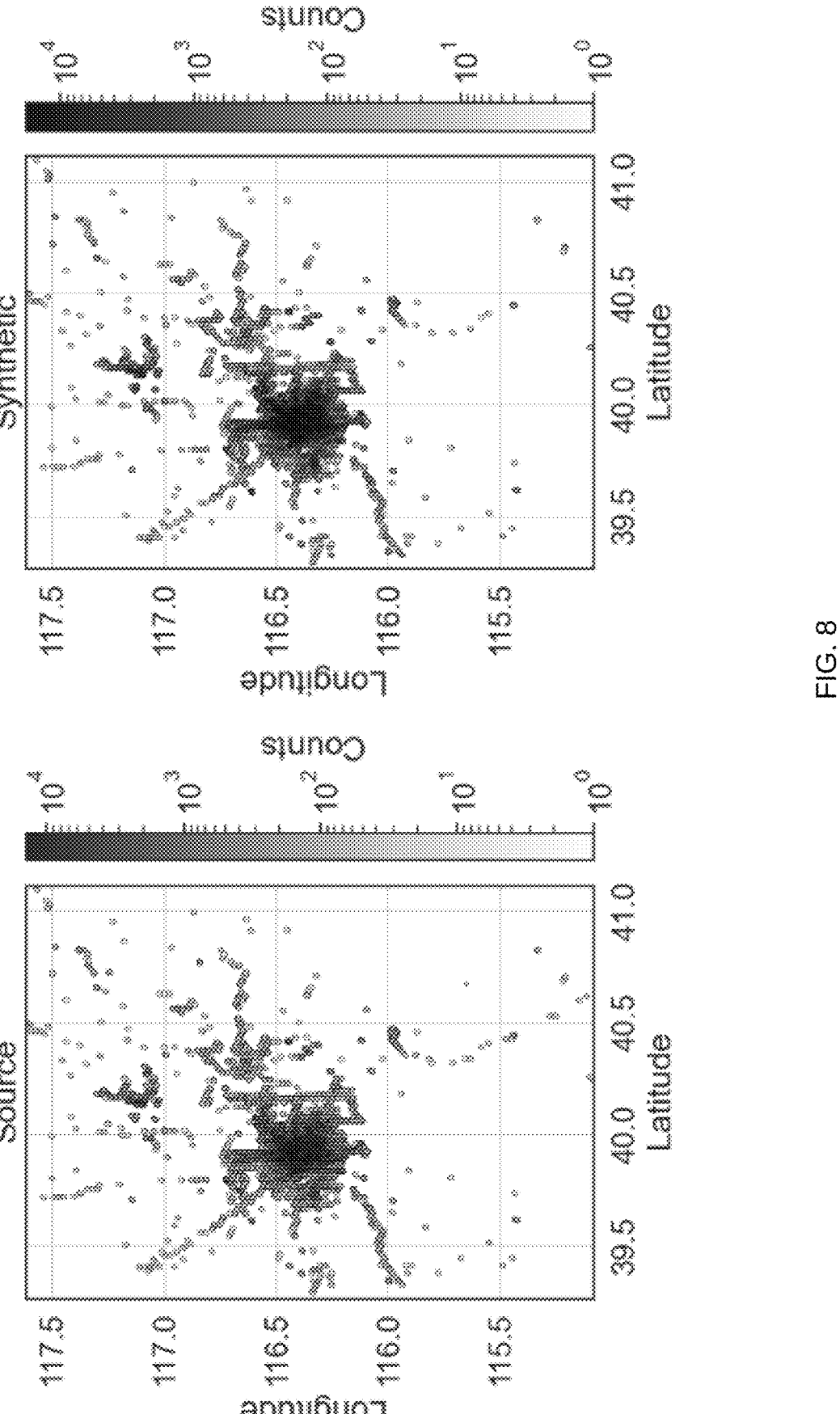
FIG. 8 is a heatmap of the density of GPS records/points across all paths in the real and synthetic datasets for T-drive dataset.
Figure 9:
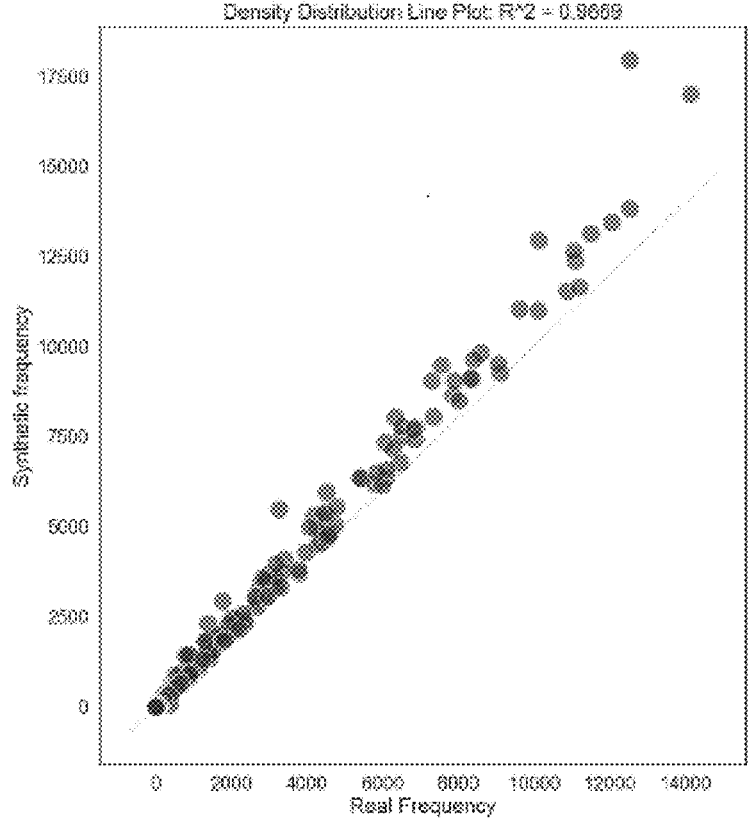
FIG. 9 is a plot showing the comparison of the density of the GPS records/points in geospatial mesh units (i.e., hexbins) in the synthetic and real datasets for the T-drive dataset.

FIGS. 6-12 are examples of density distribution plots for cross-validation of real and synthetic datasets from the Microsoft T-Drive taxi trajectory dataset, which includes GPS trajectories of a large number of taxis measured over a period of time. FIG. 7 shows the density distributions of the total distance traveled in kilometers per subject ID, compared between the real and synthetic datasets. FIG. 6 shows the density distributions of the total count of GPS points captured per subject ID, compared between the real and synthetic datasets. FIG. 9 represents a line plot showing the frequency of each hexbin assignment in the real dataset plotted against the frequency of each hexbin assignment in the synthetic dataset from the Microsoft T-Drive dataset. For this figure, the points that fall close to the dotted line would represent cases in which the hexbin frequencies are very similar. In FIG. 9, the $r^2$ value of the plotted frequencies is 0.97 which is close to the ideal value of 1 indicating high fidelity of the synthetic data to the real data.

Figure 10:
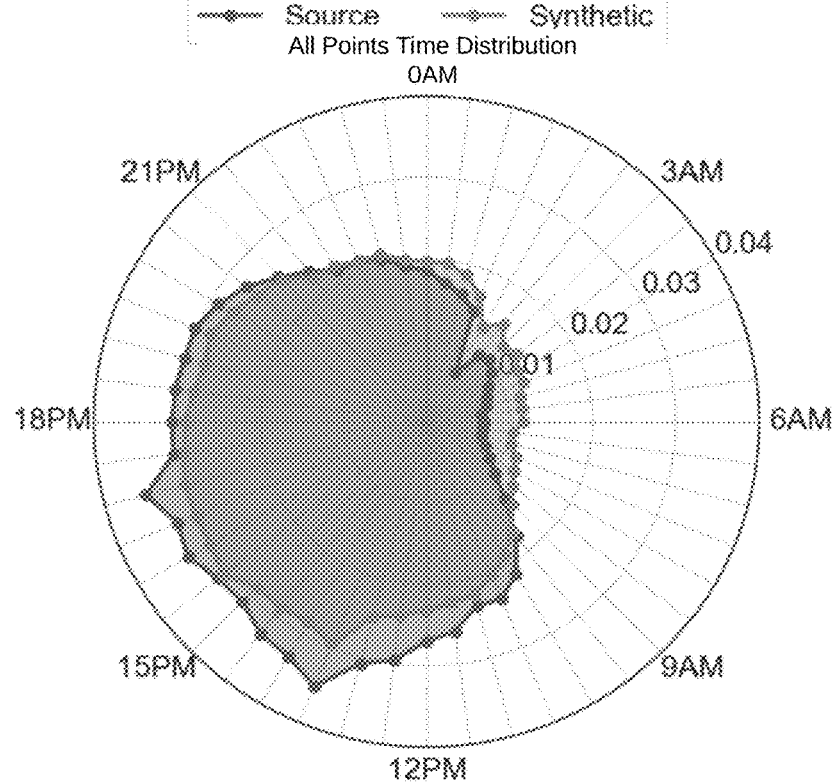
FIG. 10 is a polar plot that indicates the density of GPS records/points over time across all paths in the real and synthetic datasets for T-drive dataset.
Figure 11:
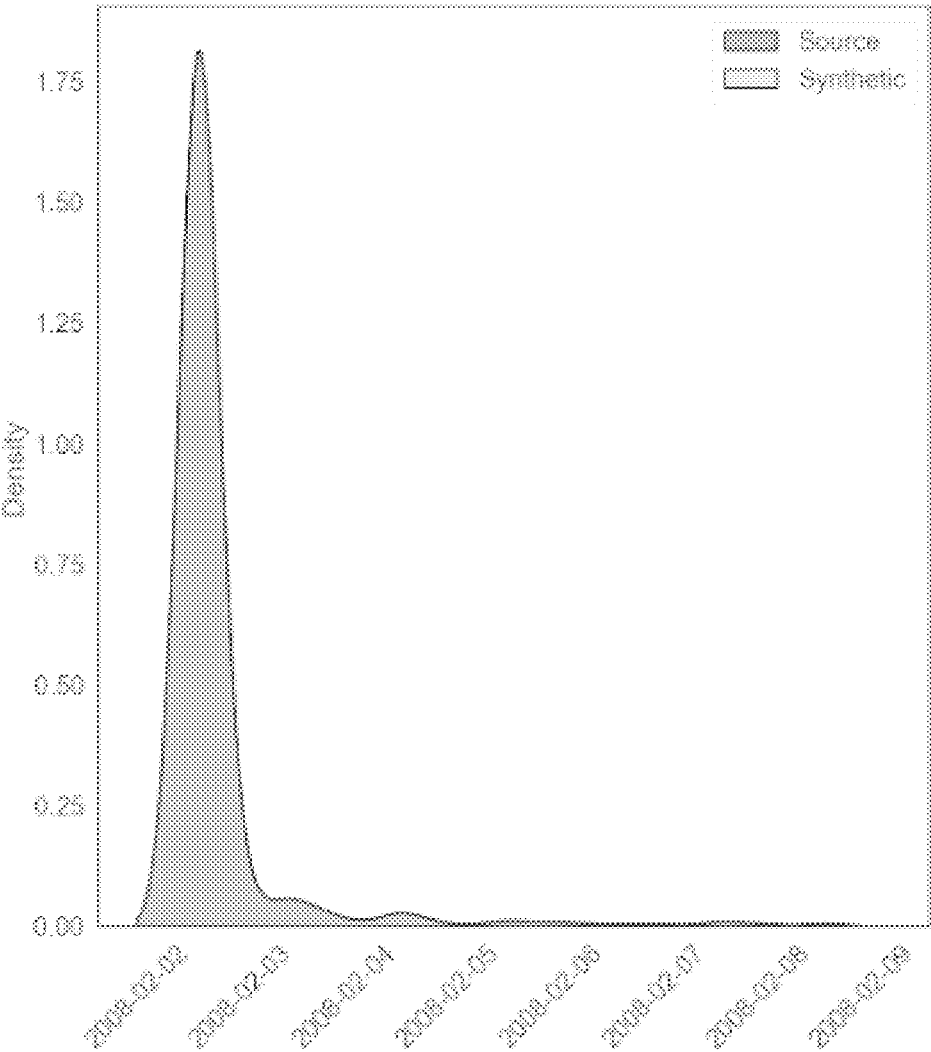
FIG. 11 is a density plot of GPS records/points across all paths over time in the real and synthetic datasets for T-drive dataset.

FIGS. 10 and 11 are examples of temporal polar plots for temporal cross-validation of the real and synthetic datasets from the Microsoft T-Drive dataset. FIG. 10 shows the distribution of times across all GPS points for all subject IDs, plotted throughout the 24 hours of a day. FIG. 11 shows the density plot of GPS records/points across all paths over time in the real and synthetic datasets for T-drive dataset.

FIG. 15 shows an example of a table of summary metrics for cross-validating the real and synthetic datasets from the Microsoft T-Drive dataset. The column "Metric" includes a description of the metric, the column "Real data" represents the metric result on the real dataset, and the column "Synthetic data" represents the metric result on the synthetic dataset.

FIG. 8 shows examples of plots showing the latitude and longitude coordinates across all points in the real and synthetic datasets from the Microsoft T-Drive dataset. The figure shows all GPS points from the source and synthetic datasets plotted side-by-side as hexbins, in which darker hex cells represent denser hexbins.

FIG. 14 defines the density error metric, which represents the Jensen-Shannon Divergence (JSD) between the density distributions across hexbins in the real and synthetic datasets. For the density error metric, a lower JSD value represents lower error, and therefore represents cases in which the hexbin distributions of the real and synthetic datasets are closer. FIG. 14 also defines the trip error metric, which represents the JSD between the start and end hexbin assignments of each trajectory in the real and synthetic datasets. The trip error value in FIG. 14 is 0.071, where a lower JSD value for trip error would represent cases in which the distributions of start and end hexbins between the real and synthetic datasets are similar.

Besides the metrics shown in the figures described above, the pattern score, pattern error, and length error metrics can also be used for cross-validation of real and synthetic datasets as shown in FIG. 14. For the pattern score and pattern error, a pattern is defined as an ordered sequence of consecutive hexbins that a GPS trajectory passes through. Pattern score is calculated by taking the top n most frequently occurring patterns in the dataset and computing the F1 score. A higher pattern score represents cases in which there are more similar top patterns between the real and synthetic datasets. Then, pattern error is calculated by taking the top n most frequently occurring patterns in the dataset, and calculating the relative difference between the patterns that occur between the real and synthetic datasets. A lower pattern error represents cases in which there are more similar top patterns between the real and synthetic datasets. Length error is calculated by taking the Euclidean distances between consecutive points and summing to get estimated trip lengths; then JSD is calculated between the distributions of estimated trip lengths in the real and synthetic datasets to obtain the trip error. A lower value for trip error represents cases in which the distribution of the trip lengths in the real and synthetic datasets is similar.

FIG. 16 is a flowchart of a method 800 for generating a synthetic dataset from road vehicle positioning data, in accordance with disclosed embodiments. The method includes determining, based at least in part on trajectory records for N road vehicles, where N is an integer, a sequence of road events for each of the N road vehicles, each road event corresponding to a respective one of the N road vehicles traveling on a particular road, thereby producing N records (805). The method further includes identifying, in each of the N records, occurrences of bigrams of a set of unique bigrams generated from the N records, each bigram corresponding to a transition between road events (810). A seed record is iteratively selected from among the N records (815) and the following is performed for each of the selected seed records.

The iterative portion of the method includes determining, for the selected seed record, a set of candidate partner records from among the N records based at least in part on a number of matching bigrams between the selected seed record and potential partner records from among the N records (820). The method further includes determining, for each candidate partner record, a subsequence of each candidate partner record and a corresponding subsequence of the selected seed record based at least in part on corresponding locations of the matching bigrams (825). A candidate partner record is selected from the set of candidate partner records based at least in part on a determination that a length difference, in terms of time, distance, or number of road events, between the subsequence of the selected seed record and the corresponding subsequence of each candidate partner record is less than a defined threshold (830). The subsequence of the selected seed record is replaced with the subsequence of the selected candidate partner record to produce a mutated seed record (835). The method further includes combining mutated seed records, after iterative selection of all of the seed records from among the N records, and any seed records in which no subsequences have been replaced, to produce a synthetic dataset having N records (840).

Aspects of the present invention may be embodied in the form of a system, a computer program product, or a method. Similarly, aspects of the present invention may be embodied as hardware, software, or a combination of both. Aspects of the present invention may be embodied as a computer program product saved on one or more computer-readable media in the form of computer-readable program code embodied thereon.

The computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code in embodiments of the present invention may be written in any suitable programming language. The program code may execute on a single computer, or on a plurality of computers. The computer may include a processing unit in communication with a computer-usable medium, where the computer-usable medium contains a set of instructions, and where the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for generating a synthetic dataset from road vehicle positioning data, the method comprising:

determining, based at least in part on trajectory records for N road vehicles, where N is an integer, a sequence of road events for each of the N road vehicles, each road event corresponding to a respective one of the N road vehicles traveling on a particular road, thereby producing N records;

identifying, in each of the N records, occurrences of bigrams of a set of unique bigrams generated from the N records, each bigram corresponding to a transition between road events;

iteratively selecting a seed record from among the N records and performing for each of the selected seed records:

determining, for the selected seed record, a set of candidate partner records from among the N records based at least in part on a number of matching bigrams between the selected seed record and potential partner records from among the N records;

determining, for each candidate partner record, a subsequence of said each candidate partner record and a corresponding subsequence of the selected seed record based at least in part on corresponding locations of the matching bigrams;

selecting a candidate partner record from the set of candidate partner records based at least in part on a determination that a length difference, in terms of time, distance, or number of road events, between the subsequence of the selected seed record and the corresponding subsequence of each candidate partner record is less than a defined threshold; and replacing the subsequence of the selected seed record with the subsequence of the selected candidate partner record to produce a mutated seed record; and combining mutated seed records, after iterative selection of all of the seed records from among the N records, and any seed records in which no subsequences have been replaced, to produce a synthetic dataset having N records.

2. The method of claim 1, further comprising:

receiving an original dataset comprising the trajectory records for the N road vehicles, the trajectory records comprising variable length sequences, each including ordered or time-stamped geographic coordinates;

assigning each geographic coordinate to a geographic hexbin;

performing reverse geocoding on the trajectory records to obtain road names for each geographic coordinate; and combining the trajectory records to form a composite dataset, each record of the composite dataset comprises a vehicle identification, a latitude coordinate, a longitude coordinate, a date and time stamp, a road name, and a hexbin assignment.

3. The method of claim 1, further comprising generating a bigram dictionary by correlating the bigrams in the N records (r) to produce the set of unique bigrams and determining a number of occurrences of each of the unique bigrams.

4. The method of claim 1, further comprising exchanging points of interest (POIs) within the trajectory records with POIs within a defined distance.

5. The method of claim 1, wherein, for each candidate partner record, the subsequence of the selected seed record and the corresponding subsequence of each candidate partner record are defined as a set of bigrams located between a location of a first selected matching bigram and a location of a second selected matching bigram of at least two matching bigrams.

6. The method of claim 5, wherein said determining the set of partner records comprises selecting a set of q partner records from among the N records that are most similar to the selected seed record, where q is an integer, and wherein similarity is based at least in part on a number of matching bigrams between the selected seed record and potential partner records from among the N records.

7. The method of claim 6, wherein, in said determining a set of q partner records, similarity is based at least in part on the number of matching bigrams between the selected seed record and the potential partner records among the N records, divided by a total number of unique bigrams within the selected seed record.

8. The method of claim 5, further comprising:
iteratively selecting a seed record from among the N records of the synthetic dataset and performing for each of the selected seed records:
  determining, for the selected seed record, a set of candidate partner records from among the N records based at least in part on a number of matching bigrams between the selected seed record and potential partner records from among the N records;
  determining, for each candidate partner record, a subsequence of said each candidate partner record and a corresponding subsequence of the selected seed record based at least in part on corresponding locations of the matching bigrams,
    wherein, for each candidate partner record, the subsequence of the selected seed record and the corresponding subsequence of each candidate partner record are defined as: (i) a set of bigrams located between a start of the seed record or said each candidate partner record, respectively, and a location of a matching bigram of one or more matching bigrams, or (ii) a set of bigrams located between a location of the matching bigram, of said one or more matching bigrams, and an end of the seed record or said each candidate partner record, respectively;
  selecting a candidate partner record from the set of candidate partner records based at least in part on a determination that a length difference, in terms of time, distance, or number of road events, between the subsequence of the selected seed record and the corresponding subsequence of each candidate partner record is less than a defined threshold; and
  replacing the subsequence of the selected seed record with the subsequence of the selected candidate partner record to produce a mutated seed record; and
combining mutated seed records, after iterative selection of all of the seed records from among the N records, and any seed records in which no subsequences have been replaced, to produce a mutated synthetic dataset having N records.

9. The method of claim 1, wherein said determining the set of partner records comprises selecting a set of partner records from among the N records that have a same starting hexbin, and
for each candidate partner record, the subsequence of the selected seed record and the corresponding subsequence of each candidate partner record are defined as a set of bigrams located between a start of the seed record or a start of said each candidate partner record, respectively, and a location of a selected matching bigram of one or more matching bigrams.

10. The method of claim 1, wherein said determining the set of partner records comprises selecting a set of partner records from among the N records that have a same ending hexbin, and for each candidate partner record, the subsequence of the selected seed record and the corresponding subsequence of each candidate partner record are defined as a set of bigrams located between a location of a selected matching bigram, of one or more matching bigrams, and an end of the seed record or an end of said each candidate partner record, respectively.

11. The method of claim 1, wherein, in said selecting one of the candidate partner records from the set of candidate partner records, one of the candidate partner records is randomly selected if more than one of the candidate partner records has a length difference less than the defined threshold.

12. A system for generating a synthetic dataset from road vehicle positioning data, comprising:
one or more processors in communication with a memory, the memory storing instructions executable by said one or more processors to perform:
  determining, based at least in part on trajectory records for N road vehicles, where N is an integer, a sequence of road events for each of the N road vehicles, each road event corresponding to a respective one of the N road vehicles traveling on a particular road, thereby producing N records;
  identifying, in each of the N records, occurrences of bigrams of a set of unique bigrams generated from the N records, each bigram corresponding to a transition between road events;
  iteratively selecting a seed record from among the N records and performing for each of the selected seed records:
    determining, for the selected seed record, a set of candidate partner records from among the N records based at least in part on a number of matching bigrams between the selected seed record and potential partner records from among the N records;
    determining, for each candidate partner record, a subsequence of said each candidate partner record and a corresponding subsequence of the selected seed record based at least in part on corresponding locations of the matching bigrams;
    selecting a candidate partner record from the set of candidate partner records based at least in part on a determination that a length difference, in terms of time, distance, or number of road events, between the subsequence of the selected seed record and the corresponding subsequence of each candidate partner record is less than a defined threshold; and
    replacing the subsequence of the selected seed record with the subsequence of the selected candidate partner record to produce a mutated seed record; and
  combining mutated seed records, after iterative selection of all of the seed records from among the N records, and any seed records in which no subsequences have been replaced, to produce a synthetic dataset having N records.

13. The system of claim 12, the memory further storing instructions executable by said one or more processors to perform:
receiving an original dataset comprising the trajectory records for the N road vehicles, the trajectory records comprising variable length sequences, each including ordered or time-stamped geographic coordinates;
assigning each geographic coordinate to a geographic hexbin;
performing reverse geocoding on the trajectory records to obtain road names for each geographic coordinate; and combining the trajectory records to form a composite dataset, each record of the composite dataset comprises a vehicle identification, a latitude coordinate, a longitude coordinate, a date and time stamp, a road name, and a hexbin assignment.

14. The system of claim 12, the memory storing instructions executable by said one or more processors wherein, for each candidate partner record, the subsequence of the selected seed record and the corresponding subsequence of each candidate partner record are defined as a set of bigrams located between a location of a first selected matching bigram and a location of a second selected matching bigram of at least two matching bigrams.

15. A non-transitory computer-readable medium comprising instructions that, when executed by one or more processors of a computer, cause said one or more processors to become configured to perform:

determining, based at least in part on trajectory records for N road vehicles, where N is an integer, a sequence of road events for each of the N road vehicles, each road event corresponding to a respective one of the N road vehicles traveling on a particular road, thereby producing N records;

identifying, in each of the N records, occurrences of bigrams of a set of unique bigrams generated from the N records, each bigram corresponding to a transition between road events;

iteratively selecting a seed record from among the N records and performing for each of the selected seed records:

determining, for the selected seed record, a set of candidate partner records from among the N records based at least in part on a number of matching bigrams between the selected seed record and potential partner records from among the N records;

determining, for each candidate partner record, a subsequence of said each candidate partner record and a corresponding subsequence of the selected seed record based at least in part on corresponding locations of the matching bigrams;

selecting a candidate partner record from the set of candidate partner records based at least in part on a determination that a length difference, in terms of time, distance, or number of road events, between the subsequence of the selected seed record and the corresponding subsequence of each candidate partner record is less than a defined threshold; and replacing the subsequence of the selected seed record with the subsequence of the selected candidate partner record to produce a mutated seed record; and combining mutated seed records, after iterative selection of all of the seed records from among the N records, and any seed records in which no subsequences have been replaced, to produce a synthetic dataset having N records.

16. The computer-readable medium of claim 15, further comprising instructions that, when executed by one or more processors of a computer, cause said one or more processors to become configured to perform:

receiving an original dataset comprising the trajectory records for the N road vehicles, the trajectory records comprising variable length sequences, each including ordered or time-stamped geographic coordinates;

assigning each geographic coordinate to a geographic hexbin;

performing reverse geocoding on the trajectory records to obtain road names for each geographic coordinate; and combining the trajectory records to form a composite dataset, each record of the composite dataset comprises a vehicle identification, a latitude coordinate, a longitude coordinate, a date and time stamp, a road name, and a hexbin assignment.

17. The computer-readable medium of claim 15, further comprising instructions that, when executed by one or more processors of a computer, cause said one or more processors to become configured to carry out the method wherein, for each candidate partner record, the subsequence of the selected seed record and the corresponding subsequence of each candidate partner record are defined as a set of bigrams located between a location of a first selected matching bigram and a location of a second selected matching bigram of at least two matching bigrams.

18. The computer-readable medium of claim 17, further comprising instructions that, when executed by one or more processors of a computer, cause said one or more processors to become configured to carry out the method wherein said determining the set of partner records comprises selecting a set of q partner records from among the N records that are most similar to the selected seed record, where q is an integer, and wherein similarity is based at least in part on a number of matching bigrams between the selected seed record and potential partner records from among the N records.

19. The computer-readable medium of claim 17, further comprising instructions that, when executed by one or more processors of a computer, cause said one or more processors to become configured to perform:

iteratively selecting a seed record from among the N records of the synthetic dataset and performing for each of the selected seed records:

determining, for the selected seed record, a set of candidate partner records from among the N records based at least in part on a number of matching bigrams between the selected seed record and potential partner records from among the N records;

determining, for each candidate partner record, a subsequence of said each candidate partner record and a corresponding subsequence of the selected seed record based at least in part on corresponding locations of the matching bigrams, wherein, for each candidate partner record, the subsequence of the selected seed record and the corresponding subsequence of each candidate partner record are defined as: (i) a set of bigrams located between a start of the seed record or said each candidate partner record, respectively, and a location of a matching bigram of one or more matching bigrams, or (ii) a set of bigrams located between a location of the matching bigram, of said one or more matching bigrams, and an end of the seed record or said each candidate partner record, respectively;

selecting a candidate partner record from the set of candidate partner records based at least in part on a determination that a length difference, in terms of time, distance, or number of road events, between the subsequence of the selected seed record and the corresponding subsequence of each candidate partner record is less than a defined threshold; and replacing the subsequence of the selected seed record with the subsequence of the selected candidate partner record to produce a mutated seed record; and combining mutated seed records, after iterative selection of all of the seed records from among the N records, and any seed records in which no subsequences have been replaced, to produce a mutated synthetic dataset having N records.

20. The computer-readable medium of claim 15, further comprising instructions that, when executed by one or more processors of a computer, cause said one or more processors to become configured to carry out the method wherein said determining the set of partner records comprises selecting a set of partner records from among the N records that have a same starting hexbin, and for each candidate partner record, the subsequence of the selected seed record and the corresponding subsequence of each candidate partner record are defined as a set of bigrams located between a start of the seed record or a start of said each candidate partner record, respectively, and a location of a selected matching bigram of one or more matching bigrams.

21. The computer-readable medium of claim 15, further comprising instructions that, when executed by one or more processors of a computer, cause said one or more processors to become configured to carry out the method wherein said determining the set of partner records comprises selecting a set of partner records from among the N records that have a same ending hexbin, and for each candidate partner record, the subsequence of the selected seed record and the corresponding subsequence of each candidate partner record are defined as a set of bigrams located between a location of a selected matching bigram, of one or more matching bigrams, and an end of the seed record or an end of said each candidate partner record, respectively.

* * * * *